US010162855B2

(12) United States Patent
Andros

(10) Patent No.: US 10,162,855 B2
(45) Date of Patent: Dec. 25, 2018

(54) SYSTEMS AND METHODS FOR OPTIMIZING DATA ANALYSIS

(71) Applicant: Dundas Data Visualization, Inc., Toronto (CA)

(72) Inventor: Oleg Andros, Newmarket (CA)

(73) Assignee: Dundas Data Visualization, Inc., Toronto (CA)

( * ) Notice: Subject to any disclaimer, the term of this patent is extended or adjusted under 35 U.S.C. 154(b) by 511 days.

(21) Appl. No.: 14/734,317

(22) Filed: Jun. 9, 2015

(65) Prior Publication Data

US 2015/0356137 A1 Dec. 10, 2015

Related U.S. Application Data

(60) Provisional application No. 62/105,910, filed on Jan. 21, 2015, provisional application No. 62/105,782, filed on Jan. 21, 2015, provisional application No. 62/009,385, filed on Jun. 9, 2014.

(51) Int. Cl.
*G06F 17/30* (2006.01)

(52) U.S. Cl.
CPC .... *G06F 17/30442* (2013.01); *G06F 17/3053* (2013.01); *G06F 17/30327* (2013.01); *G06F 17/30864* (2013.01)

(58) Field of Classification Search
CPC ......... G06F 17/30327; G06F 17/30442; G06F 17/3053; G06F 17/30864
See application file for complete search history.

(56) References Cited

U.S. PATENT DOCUMENTS

| | | | |
|---|---|---|---|
| 6,088,691 | A | 7/2000 | Bhargava et al. |
| 6,289,462 | B1 | 9/2001 | McNabb et al. |
| 6,448,958 | B1 | 9/2002 | Muta |
| 7,114,007 | B2 | 9/2006 | Sasaki |
| 7,565,683 | B1 | 7/2009 | Huang et al. |
| 7,669,244 | B2 | 2/2010 | Smith |

(Continued)

OTHER PUBLICATIONS

Wikipedia, "Hypergraph", retrieved Sep. 5, 2017.*

(Continued)

*Primary Examiner* — Scott A. Waldron
(74) *Attorney, Agent, or Firm* — Bereskin & Parr LLP/S.E.N.C.R.L., s.r.l.

(57) ABSTRACT

Methods and systems are provided for optimizing data analysis. An example method for optimizing a computer for performing queries of a database can include determining a number of distinct members in a lowest hierarchy level of each hierarchy dimension and determining a unique hierarchy identifier for such distinct member; determining the hierarchy dimension with the fewest number of distinct members in its lowest level; ranking the hierarchy dimensions by the number of distinct members in the lowest level; generating a first hypergraph tree for the hierarchy dimension with the fewest number of distinct members in its lowest level; and generating an additional hypergraph tree for a hierarchy dimension having more than the fewest number of distinct members in its lowest level. Each hypergraph tree includes multiple nodes and each node corresponds to one of the unique hierarchy identifiers. The additional hypergraph tree includes fewer tiers than the first hypergraph tree.

24 Claims, 27 Drawing Sheets

(56) References Cited

U.S. PATENT DOCUMENTS

| | | | |
|---|---|---|---|
| 7,797,676 B2 | 9/2010 | Agapi et al. | |
| 7,822,662 B2 | 10/2010 | Guzik et al. | |
| 7,900,139 B2 | 3/2011 | Hosotsubo | |
| 7,958,120 B2 | 6/2011 | Muntz et al. | |
| 8,261,181 B2 | 9/2012 | Tien et al. | |
| 8,392,877 B1 | 3/2013 | Chiluvuri | |
| 8,423,494 B2 | 4/2013 | Barrett et al. | |
| 8,429,151 B2 | 4/2013 | Nica et al. | |
| 8,683,370 B2 | 3/2014 | Marchand et al. | |
| 2003/0236732 A1 | 12/2003 | Cimral et al. | |
| 2004/0001092 A1 | 1/2004 | Rothwein et al. | |
| 2004/0133536 A1 | 7/2004 | Uceda-Sosa | |
| 2004/0208370 A1 | 10/2004 | Whatmough | |
| 2005/0027871 A1 | 2/2005 | Bradley et al. | |
| 2005/0050315 A1 | 3/2005 | Burkhardt et al. | |
| 2005/0071737 A1 | 3/2005 | Adendorff et al. | |
| 2005/0091241 A1 | 4/2005 | Mills, III et al. | |
| 2005/0216831 A1 | 9/2005 | Guzik et al. | |
| 2005/0240467 A1 | 10/2005 | Eckart et al. | |
| 2006/0010164 A1 | 1/2006 | Netz et al. | |
| 2006/0031182 A1 | 2/2006 | Ryan et al. | |
| 2006/0212791 A1 | 9/2006 | Crow et al. | |
| 2006/0259629 A1 | 11/2006 | Usmani et al. | |
| 2007/0088731 A1* | 4/2007 | Chant | G06F 17/30589 707/999.101 |
| 2007/0106643 A1* | 5/2007 | Croft | G06F 17/30489 707/999.003 |
| 2007/0180519 A1 | 8/2007 | Boccon-Gibod et al. | |
| 2007/0226314 A1 | 9/2007 | Eick et al. | |
| 2007/0234198 A1 | 10/2007 | Tien et al. | |
| 2007/0245238 A1 | 10/2007 | Fugitt et al. | |
| 2008/0010233 A1 | 1/2008 | Sack et al. | |
| 2008/0059441 A1 | 3/2008 | Gaug et al. | |
| 2008/0115103 A1 | 5/2008 | Datars et al. | |
| 2008/0127052 A1 | 5/2008 | Rostoker | |
| 2008/0229213 A1 | 9/2008 | Hamilton et al. | |
| 2008/0256439 A1 | 10/2008 | Boreham et al. | |
| 2008/0256440 A1 | 10/2008 | Boreham et al. | |
| 2008/0294471 A1 | 11/2008 | Gupta et al. | |
| 2008/0294680 A1 | 11/2008 | Powell et al. | |
| 2009/0055724 A1 | 2/2009 | Van ham et al. | |
| 2009/0157447 A1 | 6/2009 | Busch | |
| 2009/0187845 A1 | 7/2009 | Middelfart | |
| 2009/0217150 A1 | 8/2009 | Lin | |
| 2009/0265654 A1 | 10/2009 | Dieberger et al. | |
| 2010/0058466 A1 | 3/2010 | Marchand et al. | |
| 2010/0100562 A1 | 4/2010 | Millsap | |
| 2010/0161677 A1 | 6/2010 | Zurek et al. | |
| 2010/0251129 A1 | 9/2010 | Beringer et al. | |
| 2010/0313157 A1 | 12/2010 | Carlsson et al. | |
| 2010/0318200 A1 | 12/2010 | Foslien et al. | |
| 2011/0061013 A1 | 3/2011 | Bilicki et al. | |
| 2011/0113019 A1 | 5/2011 | Leff et al. | |
| 2011/0137917 A1 | 6/2011 | Boland et al. | |
| 2011/0145880 A1 | 6/2011 | Wang | |
| 2011/0173164 A1 | 7/2011 | Bendel et al. | |
| 2011/0173680 A1 | 7/2011 | Bates et al. | |
| 2011/0210986 A1 | 9/2011 | Goutsev et al. | |
| 2011/0214081 A1 | 9/2011 | Dobrin et al. | |
| 2011/0246925 A1 | 10/2011 | Marchand et al. | |
| 2011/0296311 A1 | 12/2011 | Dias et al. | |
| 2011/0302194 A1 | 12/2011 | Gonzalez et al. | |
| 2011/0314403 A1 | 12/2011 | Yan | |
| 2012/0041974 A1 | 2/2012 | Bäse et al. | |
| 2012/0089902 A1 | 4/2012 | Sheflin | |
| 2012/0166963 A1 | 6/2012 | Kohli et al. | |
| 2012/0179513 A1 | 7/2012 | Siklos et al. | |
| 2012/0180002 A1 | 7/2012 | Campbell et al. | |
| 2012/0180108 A1 | 7/2012 | Siklos et al. | |
| 2012/0249870 A1 | 10/2012 | Senster | |
| 2012/0254053 A1 | 10/2012 | Joa et al. | |
| 2013/0042190 A1 | 2/2013 | Ciloci | |
| 2013/0212085 A1 | 8/2013 | Nica et al. | |
| 2014/0082511 A1 | 3/2014 | Weissberg et al. | |
| 2014/0115009 A1* | 4/2014 | Lashley | G06F 17/30442 707/797 |
| 2014/0136298 A1 | 5/2014 | Marchand et al. | |
| 2015/0161550 A1 | 6/2015 | Siklos et al. | |

OTHER PUBLICATIONS

Wikipedia, "Hypertree", retrieved Sep. 5, 2017.*
Prosecution Documents relating to U.S. Appl. No. 12/552,595/U.S. Pat. No. 2010/0058466 (1st Office Action, Response, Final Office Action and Notice of Abandonment dated Jun. 6, 2012).
Prosecution Documents relating to U.S. Appl. No. 13/036,443/U.S. Pat. No. 2011/0214081 (1st Office Action, Response, 2nd Non-Final Office Action, Response, 3rd Made Final Office Action, Applicant's Interview Summary with Examiner, Response together with an After Final Consideration Program Request, Advisory Action dated Jun. 3, 2014, and Notice of Abandonment dated Sep. 23, 2014).
Prosecution Documents relating to U.S. Appl. No. 12/897,450/U.S. Pat. No. 2011/0210986 (1st Office Action, Response, 2nd Non-Final Office Action dated Dec. 24, 2013, and Notice of Abandonment dated Jul. 28, 2014).
Prosecution Documents relating to U.S. Appl. No. 12/897,550/U.S. Pat. No. 8,683,370 (1st Office Action, Response, Notice of Allowance dated Sep. 3, 2013, Notice of Allowance dated Dec. 13, 2013 and Amendment after Notice of Allowance, together with an Issue Fee Payment and Issue Notification dated Mar. 5, 2014).
Prosecution Documents relating to U.S. Appl. No. 13/267,955/U.S. Pat. No. 2012/0089902 (1st Office Action, Response, 2nd Made Final Office Action, Applicant Initiated Interview Summaries, Response/ RCE/IDS submission, 3rd Non-final Office Action, Response, 4th Made Final Office Action dated Apr. 22, 2015).
Prosecution Documents relating to U.S. Appl. No. 13/082,512/U.S. Pat. No. 2012/0179513 (1st Office Action, Response, 2nd Made Final Office Action, Response, Advisory Action, Response/RCE, 3rd Non-Final Office Action, Response, 4th Non-Final Office Action, Response and 5th Made Final Office Action dated Apr. 21, 2015).
Prosecution Documents relating to U.S. Appl. No. 13/368,441/U.S. Pat. No. 2013/0042190 (Election Restriction, Response, 1st Non-Final Office Action, Response, 2nd Made Final Office Action, Response/RCE and 3rd Non-Final Office Action dated Jan. 14, 2015, Response).
Michael Calore "How Do Native Apps and We Apps Compare?" Aug. 19, 2010, available at http://web.archive.org/web/2000819203811/ http://www.webmonkey.com/2010/08/how-do-native-apps-and-web-appscompare/.
Prosecution Documents relating to U.S. Appl. No. 13/082,556/U.S. Pat. No. 2012/0180108 (1st Office Action, Response, 2nd Made Final Office Action, Appeal Brief, 3rd Non-Final Office Action, Response, 4th Made Final Office Action dated Aug. 22, 2014 and Notice of Abandonment dated Apr. 20, 2015).
"Serialization (C# and Visual Basic)," Oct. 16, 2015, Microsoft, available at https ://web. arch ive.org/web/20 11 07270231 09/http :/ /msdn. microsoft.com/en -us/1 ibrary/ms233843. aspx.
Browne, IBM Congnos Business Intelligence V1 0.1 Intelligence Unleashed, Oct. 12, 2010.
Document relating to U.S. Appl. No. 15/133,482 (U.S. Pat. No. 2016/0232140), dated Jun. 28, 2018 (Office Action).

* cited by examiner

| | Product Name | Product ID | Product Category | Product Subcategory | Product Hierarchy ID |
|---|---|---|---|---|---|
| 320a | Snowboards | P0010 | Sport Equipment | Winter | PH110 |
| 320b | Bikes | P0025 | Sport Equipment | All Season | PH107 |
| 320c | Paddleboard | P0120 | Sport Equipment | Summer | PH109 |
| 320d | Swim Trunks | P0502 | Apparel | Swimwear | PH101 |
| 320e | Swimsuit | P0504 | Apparel | Swimwear | PH102 |
| 320f | Soccer Cleats | P1023 | Footwear | Soccer | PH105 |
| 320g | Aerobic Video | P2220 | Instructional Kit | Video | PH106 |
| 320h | Yoga Mat | P2295 | Sport Equipment | All Season | PH108 |
| 320i | Hiking Shoes (No Name Brand) | P3300 | Footwear | Hiking | PH104 |
| 320j | Hiking Shoes (Mountaineer Brand) | P3302 | Footwear | Hiking | PH103 |
| ... | ... | ... | ... | ... | ... |

FIG. 3A

| Sales Order ID | Order Date (MM-DD-YYYY) | Product ID | Region | Order Quantity | Unit Price | Total Amount |
|---|---|---|---|---|---|---|
| ... | ... | ... | ... | ... | ... | ... |
| SO402 | 02-20-2014 | P0010 | British Columbia | 1 | $450 | $450 |
| SO633 | 06-30-2014 | P0120 | British Columbia | 3 | $230 | $690 |
| ... | ... | ... | ... | ... | ... | ... |
| SO350 | 01-15-2014 | P0010 | Manitoba | 5 | $450 | $2,250 |
| SO429 | 02-20-2014 | P2295 | Manitoba | 1 | $20 | $20 |
| ... | ... | ... | ... | ... | ... | ... |
| SO352 | 01-15-2014 | P2295 | Nova Scotia | 4 | $20 | $80 |
| ... | ... | ... | ... | ... | ... | ... |
| SO300 | 01-15-2014 | P2220 | Ontario | 1 | $30 | $30 |
| SO300 | 01-15-2014 | P2295 | Ontario | 2 | $20 | $40 |
| SO400 | 02-20-2014 | P2220 | Ontario | 2 | $30 | $60 |
| SO502 | 02-20-2014 | P1023 | Ontario | 2 | $130 | $260 |
| SO522 | 06-15-2014 | P0502 | Ontario | 10 | $50 | $500 |
| ... | ... | ... | ... | ... | ... | ... |
| SO635 | 06-30-2014 | P0025 | California | 1 | $200 | $200 |
| ... | ... | ... | ... | ... | ... | ... |

FIG. 3B

Hierarchy Data

| | Order Date | Hierarchy Date ID | Region | Hierarchy Region ID | Product Name | Hierarchy Product ID | Order Quantity | Total Amount |
|---|---|---|---|---|---|---|---|---|
| 380a' | 02-20-2014 | D1415 | British Columbia | R01 | Snowboards | PH110 | 1 | $450 |
| 380b' | 06-30-2014 | D1545 | British Columbia | R01 | Paddleboard | PH109 | 3 | $690 |
| 380c' | 01-15-2014 | D1380 | Manitoba | R02 | Snowboards | PH110 | 5 | $2,250 |
| 380d' | 02-20-2014 | D1415 | Manitoba | R02 | Yoga Mat | PH108 | 1 | $20 |
| 380e' | 01-15-2014 | D1380 | Nova Scotia | R03 | Yoga Mat | PH108 | 4 | $80 |
| 380f' | 01-15-2014 | D1380 | Ontario | R04 | Aerobic Video | PH106 | 1 | $30 |
| 380g' | 01-15-2014 | D1380 | Ontario | R04 | Yoga Mat | PH108 | 2 | $40 |
| 380h' | 02-20-2014 | D1415 | Ontario | R04 | Aerobic Video | PH106 | 2 | $60 |
| 380i' | 02-20-2014 | D1415 | Ontario | R04 | Soccer Cleats | PH105 | 2 | $260 |
| 380j' | 06-15-2014 | D1530 | Ontario | R04 | Swim Trunks | PH101 | 10 | $500 |
| 380k' | 06-30-2014 | D1545 | California | R06 | Bikes | PH107 | 1 | $200 |

FIG. 6

SYSTEMS AND METHODS FOR OPTIMIZING DATA ANALYSIS

FIELD

The described embodiments relate to methods and systems for optimizing data analysis and in particular, for optimizing a computer for creating hypergraph models of data from one or more databases and performing queries of the hypergraph models.

BACKGROUND

"Dashboards" present visualizations, for example, in graph or chart form, of various metrics or information, for example, that may be derived from business data stored in one or more business databases. Such visualizations may be viewed (e.g., on a computer screen or other display device) by executives to obtain an overview of how a business is performing. Different users within an organization may view a dashboard.

Business databases may generally store a significant number of data entries. Each data entry can include one or more data values and the data values can be associated with various different data categories. Due to the large number of databases and/or the large amount of data available in the databases, the performance of queries of the business databases can involve substantial processing resources and as a result, also be fairly time-consuming.

The applicants have recognized a need for methods and systems for optimizing performance of data analysis by computers.

SUMMARY

The various embodiments described herein generally relate to methods (and associated systems configured to implement the methods) for optimizing data analysis.

In accordance with an embodiment, there is provided a method of optimizing a computer for performing queries of a database. The database can store a plurality of metric records in a computer memory, each metric record including at least one measure data value and a plurality of hierarchy data values. Each hierarchy data value is in a hierarchy dimension and each hierarchy dimension can include at least one hierarchy level. The at least one hierarchy level can include a lowest hierarchy level. Each hierarchy level can include at least one distinct hierarchy member and each hierarchy data value matches a hierarchy member in the lowest level of the corresponding hierarchy dimension. The method can include: (a) determining the number of distinct members of the lowest hierarchy level of each hierarchy dimension and determining a unique hierarchy ID for such distinct member; (b) determining the hierarchy dimension having the fewest number of distinct members in its lowest level; (c) ranking the hierarchy dimensions by number of distinct members in the respective lowest level; (d) generating a first hypergraph tree for the hierarchy dimension having the fewest number of distinct members in its lowest level, wherein the first hypergraph tree comprises a tier for each hierarchy dimension; (e) generating an additional hypergraph tree for a hierarchy dimension having more than the fewest number of distinct members in its lowest level, wherein the additional hypergraph tree comprises at least one tier for a hierarchy dimension but the additional hypergraph tree has fewer than the number of tiers in the first hypergraph tree; (f) wherein each hypergraph tree comprises a plurality of nodes, and wherein each node corresponds to one of the unique hierarchy IDs, and wherein each node comprises at least one edge weighting comprising a determined measure data value; and (g) wherein all of the nodes in a tier correspond to the same hierarchy dimension.

In some embodiments, the methods described herein can include generating a plurality of additional hypergraph trees such that a hypergraph tree has been generated for each hierarchy dimension.

In accordance with an embodiment, there is provided a system for optimizing performance of queries of a database by a computer, the system including: a computer memory storing, at least, the database for storing a plurality of metric records, each metric record comprising at least one measure data value and a plurality of hierarchy data values, wherein each hierarchy data value is in a hierarchy dimension, wherein each hierarchy dimension comprises at least one hierarchy level, said at least one hierarchy level including a lowest hierarchy level, wherein each hierarchy level comprises at least one distinct hierarchy member; and wherein each hierarchy data value matches a hierarchy member in the lowest level of the corresponding hierarchy dimension; and at least one processor configured to: determine the number of distinct members of the lowest hierarchy level of each hierarchy dimension and determine a unique hierarchy ID for such distinct member; determine the hierarchy dimension having the fewest number of distinct members in its lowest level; rank the hierarchy dimensions by number of distinct members in the respective lowest level; generate a first hypergraph tree for the hierarchy dimension having the fewest number of distinct members in its lowest level, wherein the first hypergraph tree comprises a tier for each hierarchy dimension; and generate an additional hypergraph tree for a hierarchy dimension having more than the fewest number of distinct members in its lowest level, wherein the additional hypergraph tree comprises at least one tier for a hierarchy dimension but the additional hypergraph tree has fewer than the number of tiers in the first hypergraph tree; wherein each hypergraph tree comprises a plurality of nodes, and wherein each node corresponds to one of the unique hierarchy IDs, and wherein each node comprises at least one edge weighting comprising a determined measure data value; wherein all of the nodes in a tier correspond to the same hierarchy dimension.

In some embodiments, the processor can be further configured to generate a plurality of additional hypergraph trees such that a hypergraph tree has been generated for each hierarchy dimension.

In some embodiments, the determined measure data value for a node is determined from the measure data value for each metric record including a measure data value corresponding to the node's corresponding unique hierarchy ID.

In some embodiments, at least one hierarchy dimension includes a plurality of hierarchy levels. In some embodiments, the determined unique hierarchy IDs are sequentially ordered.

In accordance with another example embodiment, there is provided a method for optimizing performance of at least one query of a database by a computer, the computer having a processor and the processor being in electronic communication with a memory storing, at least, the database, the method including: storing in the memory a set of hierarchy data tables generated based on a plurality of metric records stored in the database, each metric record including a set of data values and each data value being associated with a hierarchy dimension, each hierarchy data table being associated with a different hierarchy dimension and each hierarchy data table including a plurality of distinct data members, each distinct data member being assigned a unique hierarchy identifier; and operating the processor to assign each hierarchy dimension a dimension rank, wherein operating the processor to assign the dimension rank includes: for each hierarchy data table, determining a number of distinct data members in the respective hierarchy data table; assigning each hierarchy dimension with the dimension rank sequentially according to the determined number of distinct data members for the set of hierarchy data tables, wherein the processor is configured to assign a first dimension rank to the hierarchy dimension associated with the hierarchy data table determined to have a fewest number of distinct data members and to assign a last dimension rank to the hierarchy dimension associated with the hierarchy data table determined to have a greatest number of distinct data members; and based on the plurality of metric records, generating at least one hypergraph tree for at least one hierarchy dimension according to the assigned dimension ranks.

In some embodiments, the methods described herein further includes: generating a first hypergraph tree based on one or more data values in the plurality of metric records associated with a first hierarchy dimension, the first hierarchy dimension being the hierarchy dimension assigned the first dimension rank, wherein generating the first hypergraph tree comprises generating an initial node for each distinct data value in the first hierarchy dimension in the plurality of metric records, a data value being a distinct data value when the data value is different from all other data values in the same hierarchy dimension; and generating a subsequent hypergraph tree based on one or more data values in the plurality of metric records associated with a subsequent hierarchy dimension of one or more subsequent hierarchy dimensions, the subsequent hierarchy dimension being different from the first hierarchy dimension and the subsequent hierarchy dimension corresponding to a dimension rank subsequent to the first dimension rank.

In some embodiments, the methods described herein further includes: identifying one or more metric records having a data value in the first hierarchy dimension corresponding to the distinct data value; retrieving one or more measure data values corresponding to the identified one or more metric records; determining a measure aggregation for the retrieved one or more measure data values; and associating the initial node with, at least, the distinct data value and the determined measure aggregation.

In some embodiments, the methods described herein can include: linking one or more subsequent nodes to the initial node according to the dimension ranks, each subsequent node corresponding to one of the one or more subsequent hierarchy dimensions.

In some embodiments, the one or more subsequent nodes includes a first subsequent node corresponding to a second hierarchy dimension, the second hierarchy dimension being the hierarchy dimension assigned the second dimension rank; and the methods described herein can include: linking the one or more subsequent nodes to the initial node comprises, for the first subsequent node: identifying a subset of metric records from the identified one or more metric records, the subset of metric records having a common data value in the second hierarchy dimension; retrieving one or more first subsequent measure data values corresponding to the identified subset of metric records; determining a first subsequent measure aggregation for the retrieved one or more first subsequent measure data values; and associating the first subsequent node with the first subsequent measure aggregation.

In accordance with another example embodiment, there is provided a system for optimizing performance of at least one query of a database by a computer, the system includes: a memory storing, at least: the database storing a plurality of metric records, each metric record including a set of data values and each data value being associated with a hierarchy dimension; and a set of hierarchy data tables generated based on the plurality of metric records, each hierarchy data table being associated with a different hierarchy dimension and each hierarchy data table including a plurality of distinct data members, each distinct data member being assigned a unique hierarchy identifier; and a processor in electronic communication with the memory, the processor being configured to: assign each hierarchy dimension a dimension rank, wherein operating the processor to assign the dimension rank comprises: for each hierarchy data table, determining a number of distinct data members in the respective hierarchy data table; assigning each hierarchy dimension with the dimension rank sequentially according to the determined number of distinct data members for the set of hierarchy data tables, wherein the processor is configured to assign a first dimension rank to the hierarchy dimension associated with the hierarchy data table determined to have a fewest number of distinct data members and to assign a last dimension rank to the hierarchy dimension associated with the hierarchy data table determined to have a greatest number of distinct data members; and based on the plurality of metric records, generate at least one hypergraph tree for at least one hierarchy dimension according to the assigned dimension ranks.

In some embodiments, the processor can be further configured to: generate the at least one first hypergraph tree based on one or more data values in the plurality of metric records associated with a first hierarchy dimension, the first hierarchy dimension being the hierarchy dimension assigned the first dimension rank, wherein the processor is further configured to generate an initial node for each distinct data value in the first hierarchy dimension in the plurality of metric records, a data value being a distinct data value when the data value is different from all other data values in the same hierarchy dimension; and generate a subsequent hypergraph tree based on one or more data values in the plurality of metric records associated with a subsequent hierarchy dimension of one or more subsequent hierarchy dimensions, the subsequent hierarchy dimension being different from the first hierarchy dimension and the subsequent hierarchy dimension corresponding to a dimension rank subsequent to the first dimension rank.

In some embodiments, the processor can be further configured to: identify one or more metric records having a data value in the first hierarchy dimension corresponding to the distinct data value; retrieve one or more measure data values corresponding to the identified one or more metric records; determine a measure aggregation for the retrieved one or more measure data values; and associating the initial node with, at least, the distinct data value and the determined measure aggregation.

In some embodiments, the processor can be further configured to: link one or more subsequent nodes to the initial node according to the dimension ranks, each subsequent node corresponding to one of the one or more subsequent hierarchy dimensions.

In some embodiments, the one or more subsequent nodes can include a first subsequent node corresponding to a second hierarchy dimension, the second hierarchy dimension being the hierarchy dimension assigned the second dimension rank; and for the first subsequent node, the processor can be further configured to: identify a subset of metric records from the identified one or more metric records, the subset of metric records having a common data value in the second hierarchy dimension; retrieve one or more first subsequent measure data values corresponding to the identified subset of metric records; determine a first subsequent measure aggregation for the retrieved one or more first subsequent measure data values; and associate the first subsequent node with the first subsequent measure aggregation.

In some embodiments, the distinct data value includes a corresponding hierarchy identifier determined from the hierarchy data table associated with the first hierarchy dimension.

BRIEF DESCRIPTION OF THE DRAWINGS

Several embodiments will now be described in detail with reference to the drawings, in which:

FIG. 3A is a product table illustrating exemplary data related to at least some products being sold by a business, in accordance with an example embodiment;

FIG. 3B is a sales order table illustrating exemplary data related to at least some sales order for at least some of the products shown in FIG. 3A, in accordance with an example embodiment;

FIG. 6 is a hierarchy sales order table illustrating sales order entries and corresponding hierarchy data derived from the sales order table of FIG. 3B and the hierarchy tables of FIGS. 5A to 5C in accordance with an example embodiment;

Figure 1:
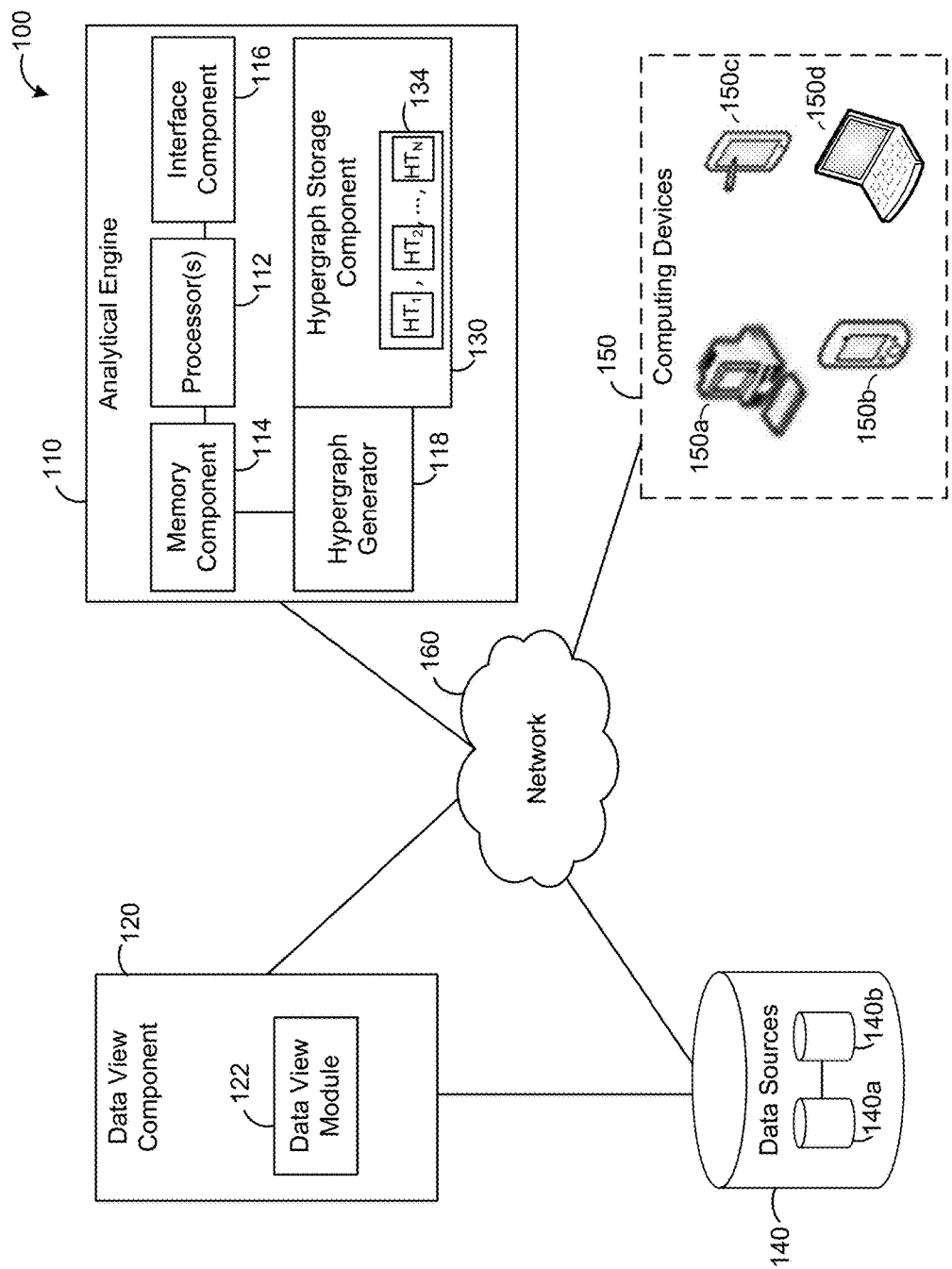
FIG. 1 is a block diagram of components interacting with an analytical engine in accordance with an example embodiment.

The drawings, described below, are provided for purposes of illustration, and not of limitation, of the aspects and features of various examples of embodiments described herein. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) for optimizing a computer for creating hypergraph models of data from one or more databases and performing queries of hypergraph models.

Businesses may generally store a significant number of data entries in one or more databases (which may also be referred to as data stores). Due to the large number of databases and/or the large amount of data available in the business databases, the performance of queries of the business databases can involve substantial processing resources and as a result, also be fairly time-consuming.

According to one aspect of the systems and methods disclosed herein, data from one or more data sources (e.g. business databases) may be aggregated and modeled using one or more hypergraph structures (e.g. hypergraph trees). The hypergraph structures are then stored and queried separately from the one or more data sources. This may be characterized as a form of 'caching' business data in order to avoid (e.g. bypass) "live" or "real-time" querying of the one or more business databases.

Querying data stored (or 'cached') in the hypergraph structures may have one or more advantages over querying the one or more data sources directly. For example, the hypergraph structures may comprise pre-calculations and/or aggregations of the data from the one or more data sources. Query performance of the hypergraph structures may be faster (and may be significantly faster) than the query performance of the one or more sources. For example, the pre-calculations and/or aggregations of the hypergraph structures may improve the performance of certain data analysis operations (e.g. "slice and dice" filtering and/or grouping). The improved query speed, or responsiveness, of the hypergraph structures may be useful in data visualization applications, such as "dashboards" and the like.

Additionally, or alternatively, the hypergraph structures may be stored and/or loaded into volatile memory (e.g. RAM), which may be characterized as in-memory storage. Query performance for in-memory storage is typically faster (and may be significantly faster) than querying one or more databases directly (e.g. over a network). The improved query speed, or responsiveness, of in-memory storage may be useful in data visualization applications, such as "dashboards" and the like.

Queries can include, at least, one or more search parameters that can define the scope of data being requested. For example, and without limitation, the described systems may receive a query from a business executive and the example query can include search parameters defining sale orders between a certain time period, such as, between Jan. 1, 2014 to Jun. 30, 2014, from the region, Ontario, Canada.

The hypergraph structures that can be generated and queried by the described systems can store various data information, depending on the application of the described systems. For example, continuing with the above example in respect of the query received by the described system from the business executive, the hypergraph structures may be generated based on data records (e.g., sale orders, etc.) associated with the business operated by the business executive. Queries of hypergraph structures based on these data records may be useful to track the performance of the respective business. The data records modeled using the hypergraph structures can, in some embodiments, include one or more metric records and each metric record can include at least one measure data value (e.g., total sale values, total number of products sold, etc.) and a corresponding hierarchy data value.

Each hierarchy data value is in a hierarchy dimension and the hierarchy dimensions can generally correspond to a type of data in the metric record (e.g., date data, product data, geographical region data, etc.). The hierarchy dimensions can vary for different databases depending on the intended use of the database. For example, the hierarchy dimensions for a database containing product sales information can include, but are not limited to, date, product identifier (ID), and geographical regions. Each hierarchy dimension can include one or more distinct predefined hierarchy data values and the hierarchy data values may be organized in one or more hierarchy levels. For example, within a region hierarchy dimension, example lowest hierarchy data values can include "Ontario" and "British Columbia", and a higher hierarchy data value for both "Ontario" and "British Columbia" can be "Canada". It will be understood that the described example hierarchy data values are merely examples and not of limitations. As briefly described, measure data values, on the other hand, can correspond to numerical data values that vary with each data entry, such as total sale values, total number of products sold, etc., and can be available for mathematical analysis.

At least some of the hierarchy information can be used in the described methods and systems for generating hypergraph structures, such as hypergraph trees, as will be described with reference to FIGS. 7A to 16. The hypergraph structures may be generated with reference to a dimension rank assigned to each hierarchy dimension, and can correspond to data storage structures. It will be understood that the hypergraph diagrams illustrated in FIGS. 7A to 9 are provided to assist in the explanation of the example embodiments, and that such diagrams may not be created, stored, and/or displayed by the systems (or using the methods) disclosed herein. It will also be appreciated that the hypergraph trees illustrated in FIGS. 10 to 16 are shown for illustrative purposes and are not intended to limit the formats of the data storage structures. Also, it will be further understood that the hypergraph trees illustrated in FIGS. 10 to 16 may not be displayed to the user.

The dimension rank can generally represent the relative number of distinct hierarchy members, or data members, associated with each hierarchy dimension. For example, a hierarchy dimension associated with the lowest number of distinct data members can be associated with a first, or highest, dimension rank while a hierarchy dimension associated with the greatest number of distinct data members can be associated with a last, or lowest dimension rank. Other hierarchy dimensions associated with intermediate numbers of distinct data members can be ranked accordingly. It will be appreciated that, alternatively, a hierarchy dimension associated with the greatest number of distinct data members can be associated with the first, or highest, dimension rank, with other hierarchy dimensions ranked in descending order according to their associated number of distinct data members.

Generally, the hypergraph generator 118, as will be described with respect to FIG. 1, may determine that a data value is a distinct data value when that data value is different from all other data values in the same hierarchy dimension. By generating multiple hypergraph structures (e.g. hypergraph trees) and generating the hypergraph structures based on the dimension ranks, the described systems can facilitate the performance of queries of the data modeled using the hypergraph structures. For example, depending on the search parameters within the received query, the relevant hypergraph structure(s) (e.g., the hypergraph structure(s) containing data associated with the search parameters) can be queried and as a result, unnecessary querying of irrelevant data can be avoided.

Reference is first made to FIG. 1, which illustrates a block diagram 100 of components interacting with an analytical engine 110.

As shown, the analytical engine 110 may communicate with one or more data sources 140, one or more computing devices 150, and a data view component 120 (which may be referred to as a data cube component 120) via a network 160.

The analytical engine 110 includes one or more processors 112, a memory component 114, and an interface component 116. Memory component 114 comprises software code for implementing a hypergraph generator 118, and also includes a hypergraph storage component 130.

It will be understood that, in some embodiments, each of the processor 112, the memory component 114, the interface component 116, and the hypergraph generator 118 may be combined into fewer modules or may be separated into further modules. Furthermore, the processor 112, the memory component 114, the interface component 116, and hypergraph generator 118 may be implemented in software or hardware, or a combination of software and hardware.

For ease of exposition, the analytical engine 110 is shown in FIG. 1 as being provided by one computer server. However, it will be understood that the analytical engine 110 may instead be provided using multiple computer servers distributed over a wide geographic area and connected via the network 160. Example computer servers can include, but not limited to, database servers, application servers, and/or web servers.

The processor 112 can generally control the operation of the analytical engine 110. For example, the processor 112 can initiate and manage the operations of each of the other components in the analytical engine 110. The processor 112 may also determine, based on received data, stored data and/or user preferences, how the analytical engine 110 may generally operate.

The processor 112 may be any suitable one or more processors, controllers or digital signal processors that can provide sufficient processing power depending on the configuration, purposes and requirements of the analytical engine 110. In some embodiments, the processor 112 can include more than one processor with each processor being configured to perform different dedicated tasks.

The hypergraph generator 118 can be operated by the processor 112 for generating the described hypergraph structures, and/or modifying the hypergraph structures. Operation of the hypergraph generator 118 will be described further below with reference to FIGS. 7A to 16.

The interface component 116 may be any interface that enables the analytical engine 110 to communicate with other devices and systems. In some embodiments, the analytical engine 110 can include a serial port, a parallel port, and/or a USB port. The interface component 116 may also include at least one of an Internet, Local Area Network (LAN), Ethernet, Firewire, modem, or digital subscriber line connection. Various combinations of these elements may be incorporated within the interface component 116.

The interface component 116 can send and/or receive various data via the network 160. For example, the interface component 116 can operate to receive data associated with the metric records, or variations of the metric records, stored in the data sources 140 and/or the data view component 120. The data associated with the metric records can include hierarchy data (e.g., region, product, date, etc.) and measure data (e.g., total sale values, total number of products sold, etc.), for example. Example metric records will be described with reference to FIGS. 3A and 3B.

The interface component 116 may also operate to provide various user interfaces for receiving input from various users and/or displaying information to the users. An example user interface will be described with respect to FIG. 2, which is a screenshot 200 of an example dashboard interface 202. For example, the example query described above in respect of the sale orders between Jan. 1, 2014 to Jun. 30, 2014, from the region, Ontario, Canada can be received via the dashboard interface 202 from the business executive.

The memory component 114 can include RAM, ROM, one or more hard drives, one or more flash drives or some other suitable data storage elements such as disk drives, etc. The memory component 114 may include one or more database(s) and/or file system(s). For example, memory component 114 may accept data from the hypergraph generator 118 and/or processor 112 and may store, for example, the hypergraph structures, in non-persistent and/or persistent memory.

Memory component 114 may also be used to store an operating system and/or other programs as is commonly known by those skilled in the art. For instance, an operating system provides various basic operational processes for the computer server providing analytical engine 110 in the example shown in FIG. 1. Other programs may include various user programs so that a user can interact with analytical engine 110 to perform various functions such as, but not limited to, viewing and manipulating data as well as sending queries and receiving query results as the case may be.

The data sources 140 include one or more databases, such as databases 140a and 140b, which contain data that may be stored in one or more hypergraph data structures by analytical engine 110. For example, in respect of the above described example query, the data sources 140 can store data that a user, such as the business executive, may want to query, such as data related to the operation of the business, such as sale orders received by the business. The data sources 140 may include, for example, relational databases, non-relational databases, web services, cloud services, excel files, flat files, native data structures, and/or one or more joint native database tables. Native data structures can include database tables, database views, stored procedures, functions, and/or Online Analytical Processing (OLAP) cubes.

Figure 2:
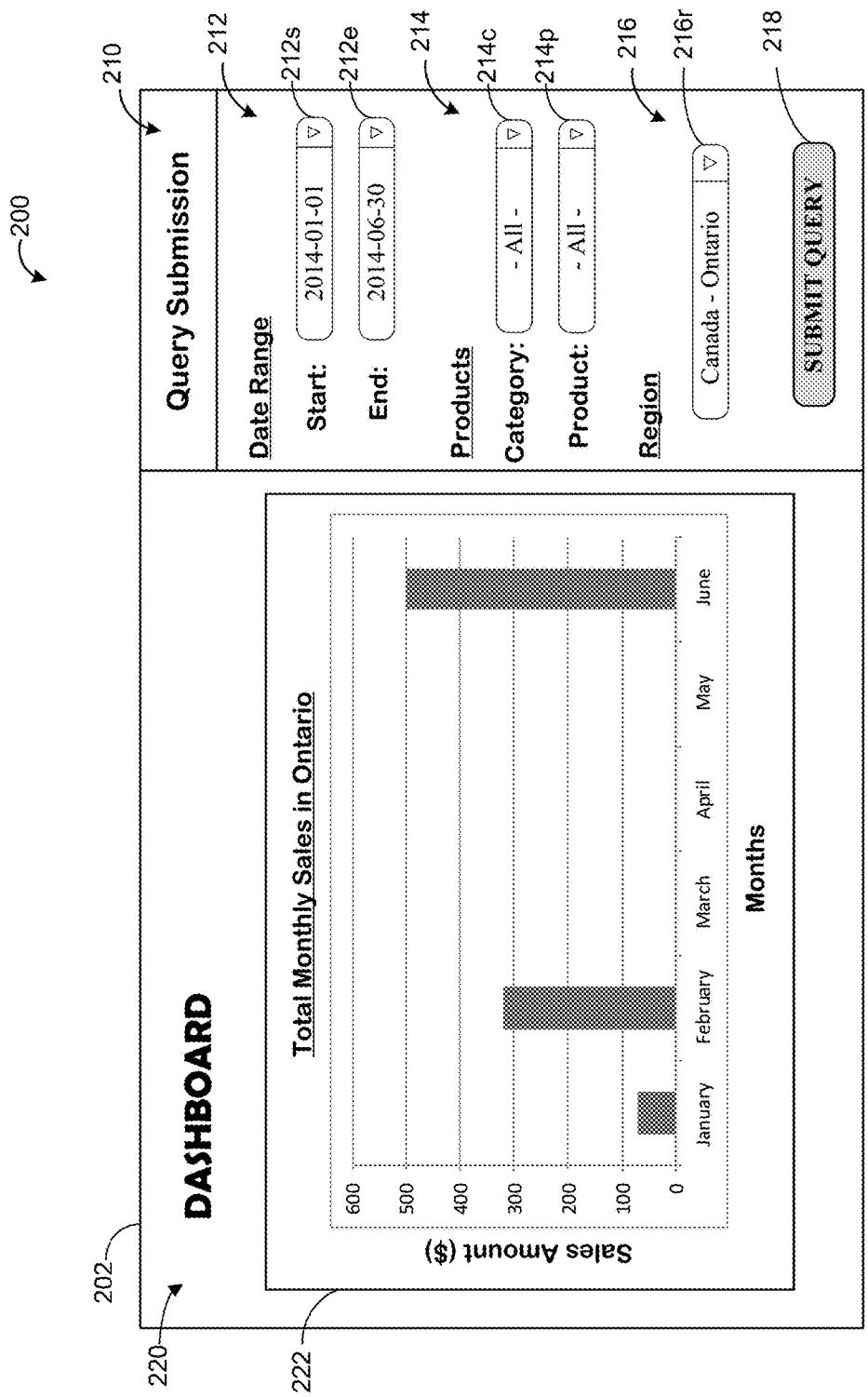
FIG. 2 is a screenshot of a dashboard interface in accordance with an example embodiment.

For example, for providing the dashboard interface 202 of FIG. 2, the data sources 140 can include one or more databases for providing data in respect of the relevant products, regions, and sales orders. The data may be provided in one database or in multiple databases. It will be understood that other data may also be provided at the data sources 140. For example, the data sources 140 can include multiple databases for different types of data, such as a product database 140a for storing the data associated with the products that are sold by the relevant business and a sale order database 140b for storing the data associated with the sale orders received by the relevant business. In some embodiments, the product data and the sale order data may be stored together in one database. It will be understood that other databases 140 may similarly be provided, depending on the design of the described system.

The data view component 120 includes a data view module 122 and is in communication with the one or more databases 140, which may store data related to the operation of the business, such as sales orders received by the business. In some embodiments, the data view component 120 may be provided by the same computer server(s) as the analytical engine 110.

Data view component 120 is configured to retrieve and combine data from the one or more data sources 140 and to provide the combined data to analytical engine 110, e.g. as a fact table.

The data view module 122 can allow a user (e.g. a data analyst, a business analyst, a developer) to modify the structure of the data provided by the data sources 140 so that the data output to the analytical engine 110 includes one or more data tables with one or more columns corresponding to a hierarchy dimension and/or a measure.

Also, the hypergraph generator 118 may operate to regenerate the data corresponding to the hypergraph structures 134 stored in the memory component 114 to reflect changes in the data stored in the data sources 140. Since the data in the data sources 140 can continue to change, the hypergraph generator 118 may operate to periodically regenerate the hypergraph structures 134 at predefined periods and/or in response to predefined events (e.g., new inventory of products being introduced, etc.). In some embodiments, the hypergraph generator 118 may operate to regenerate the hypergraph structures 134 on-demand or upon user request. In some embodiments, the hypergraph generator 118 may determine that the changes in the data in the data sources 140 exceed a data change threshold. The data change threshold may correspond to a maximum amount of change in the data. In response, the hypergraph generator 118 may proceed to regenerate the hypergraph structures 134.

The computing devices 150 may be any networked device operable to connect to the network 160. A networked device is a device capable of communicating with other devices through a network such as the network 160. A network device may couple to the network 160 through a wired or wireless connection.

Computing devices 150 may include at least a processor and memory. Example computing devices 150 include a personal computer 150a, a smartphone 150b, an electronic tablet device 150c, and/or a laptop 150d. Other computing devices 150 (not shown) may also include a workstation, server, portable computer, mobile device, personal digital assistant, WAP phone, an interactive television, video display terminals, gaming consoles, and portable electronic devices or any combination of these.

The network 160 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the analytical engine 110, the data view component 120 and/or the data sources 140, and the computing devices 150.

Reference will now be made to FIGS. 3A and 3B, which are example data tables 300 and 350, respectively, that can be generated by the data view component 120. It will be understood that the data stored in the data tables 300 and 350 may also be provided in the data sources 140 but in another configuration.

FIG. 3A is an example product table 300 illustrating data related to at least some of the products offered by a user of the analytical engine 110. The user may, for example, be a business that sells the products shown in the product table 300. The product table 300 includes multiple product entries 320 for each distinct, or unique, product. In the illustrated example of FIG. 3A, product entries 320a to 320j are shown. However, it will be understood that the illustrated product entries 320a to 320j are merely shown for illustrative purposes and that, for at least some applications of the systems described herein, the product table 300 may include other product entries 320 that are not shown.

For each product entry 320, the product table 300 can include various information for the products, such as a product name 310, a product identifier 312, a product category 314, and a product subcategory 316. For example, the product entry 320a includes the product name 310 "snowboards", the product identifier 312 "P0010", the product category "sport equipment" and the product subcategory "winter".

The product name 310 can be a name of the product 320 (e.g., snowboards, bikes, paddleboard, etc.), the product identifier 312 can be a manufacturer or vender identifier for the product 320 (e.g., "P0010" for snowboards, "P0025" for bikes", "P0120" for paddleboard, etc.), the product category 314 can indicate a product type (e.g., sport equipment, apparel, footwear, etc.) and the product subcategory 316 can indicate a more specific product type (e.g., winter, all season, swimwear, soccer, etc.). In some embodiments, a product may not be associated with a value for one of the product category 314 and the product subcategory 316, and so, the values in the product category 314 and the product subcategory 316 for that product may be the same in those embodiments.

Only a portion of the illustrated product information may be used by the analytical engine 110 for the purpose of performing the queries. It will be understood that the product information in the product table 300 is merely for illustrative purposes and that other information may be provided instead or in addition.

FIG. 3B is an example sales order table 350 providing data for at least some sale orders received by the user of the analytical engine 110. Similarly to the product table 300 of FIG. 3A, the sales order table 350 includes multiple sale order entries 380 for each sale order. In the illustrated example of FIG. 3B, sale order entries 380a to 380k are shown, but it will be understood that the illustrated sale order entries 380a to 380k are merely shown for illustrative purposes and that, for at least some applications of the systems described herein, the sales order table 350 may include other sale order entries 380 that are not shown.

For each sale order 380, the sales order table 350 can include various information for the sale order 380, such as a sales order identifier 360 (e.g., "SO300", "SO350", etc.), a unit price 368 (e.g., "$30", "$20", "$450", etc.), one or more hierarchy data values (e.g., hypergraph product identifier 312, etc.) and one or more measure data values (e.g., order quantity 366, sales amount 370, etc.). The sales order identifier 360 can be a unique identifier assigned by the vendor for the sale order 380. The unit price 368 can be a price for one unit of the product corresponding to the product identifier 312 in the sale order 380.

The sale order entries 380 can be considered metric records since each sale order entry 380 includes hierarchy (e.g., region, product, date, etc.) and measure data values (e.g. number of products sold, sale value, etc.), as described above.

The hierarchy data values can include data information that is predefined by the described systems and/or the relevant user of the described systems (e.g., a data analyst, a business analyst, or a developer operating data view component 120). As described, example hierarchy data values can be dates, regions (e.g., city names, state/province names, etc.) and/or categories. The hierarchy data values can be provided to the analytical engine 110 (e.g. via data view component 120) or predefined in an existing database stored in memory component 114 or the data sources 140. For example, example hierarchy data values can include an order date 362, a product identifier 312, an order region 364. Generally, as noted, each hierarchy data value can be in a hierarchy dimension. In the example of FIG. 3B, the hierarchy dimensions correspond to a data type, such as date data, product data, and region data. Each hierarchy dimension can also include one or more hierarchy levels, as will be described with reference to FIGS. 5A to 5C.

Measure data values, on the other hand, generally correspond to data values (e.g. numerical values) that vary with each data entry and contain data values that are available for mathematical analysis or computation. Example measure data values can include an order quantity 366 and a sales amount 370.

While measure data values are typically numerical values, in some embodiments measure data values may include strings or Boolean operators).

The product identifier 312 provided in the sales order table 350 can correspond to the product identifier 312 in the product table 300 in order to minimize duplication of data in each of the data tables. The order date 362 can be a date on which the sale order 380 was received by the vendor. The order region 364 can be a region at which the sale order 380 was made. Similar to the product identifier 312, the order region 364 can correspond to another database containing data in respect of the various relevant regions.

Similar to the product information shown in FIG. 3A, only a portion of the illustrated sales order information may be used by the analytical engine 110 for the purpose of performing the queries. It will be understood that the sales order information in the sales order table 350 is merely for illustrative purposes and that other information may be provided instead or in addition.

Referring again to FIG. 1, the hypergraph storage component 130 in memory component 114 can store data corresponding to the hypergraph structures generated by the analytical engine 110, such as hypergraph trees 134 (e.g., $HT_1$ to $HT_N$).

The data corresponding to the hypergraph structures 134 can be generated for the various hierarchy dimensions that may be relevant to the metric records stored in the data sources 140. A different hypergraph structure may be generated for each of the various hierarchy dimensions and the data corresponding to that hypergraph structure may be stored in the hypergraph storage component 130 based on the dimension rank assigned to each hierarchy dimension. For example, a hypergraph tree $HT_1$ can be generated for the metric records for the hierarchy dimension assigned the first dimension rank (e.g. the hierarchy dimension associated with the lowest number of distinct data members). It will be understood that the hypergraph trees 134 may be provided with various different implementations, such as B-trees and/or B+ tree structures. B+ tree structures can be a variation of a B-tree structure. Unlike the B-tree, the intermediate nodes of the B+ tree structure contain only the hierarchy identifiers (IDs) and no measure data values, while the leaf nodes (node with no further subsequent node) contain both the hierarchy identifiers and the measure data values.

Hypergraph structures 134 can represent the relevant hierarchy dimensions and the measure data. In the described systems, a node of a hypergraph structure 134 can correspond to a hierarchy data value and an edge of a hypergraph structure 134 can correspond to the relevant edge weighting, or measure values. An edge of a hypergraph structure 134 can correspond to one or more nodes and so, the edge weighting for the edge can represent the measure values for the associated one or more nodes. The edge weighting can correspond to an aggregation (e.g. a sum, a minimum, a maximum, an average, or a distinct count) of the associated one or more nodes.

Example hypergraph diagrams will be described with reference to FIGS. 7A to 9 and example hypergraph trees 134 will be described with reference to FIGS. 10 to 16. It will be understood that the hypergraph diagrams illustrated in FIGS. 7A to 9 are provided to assist in the explanation of the example embodiments, and that such diagrams may not be created, stored, and/or displayed by the systems (or using the methods) disclosed herein.

In some embodiments, the hypergraph structures may include the measure data for a portion of the associated edges. For example, the hypergraph generator 118 may determine and store the measure data for only the hierarchy dimension assigned with last hierarchy dimension (e.g., dimension rank 'N'). Depending on the parameters of a particular query, the hypergraph generator 118 can then determine the necessary measure values for the other edges in the hypergraph structures based on the stored measure data for the last hierarchy dimension. The determination of the measure data values for the various hierarchy dimensions based on the hypergraph structures will be described with reference to FIGS. 7A to 16.

Figure 4:
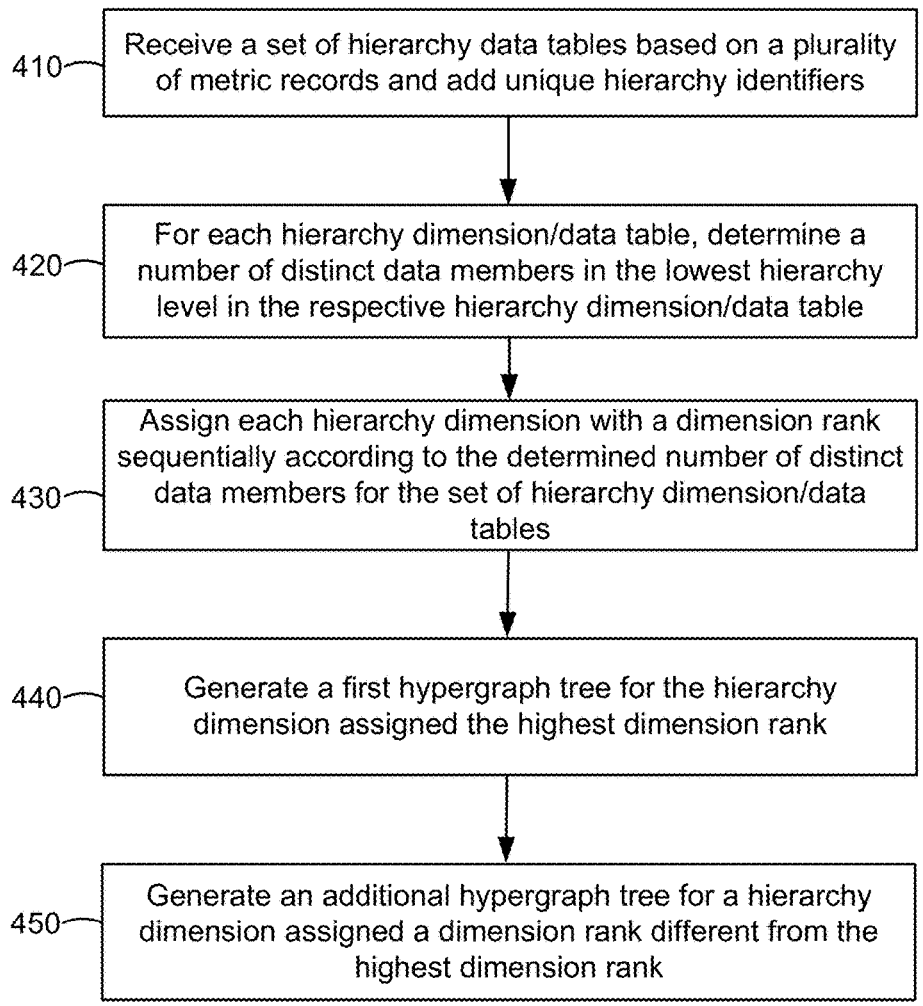
FIG. 4 is a flowchart of an example embodiment of various methods of optimizing data analysis.

Referring now to FIG. 4, which is a flowchart 400 of an example method of generating hypergraph data structures by the analytical engine 110. To illustrate the method of FIG. 4, reference will be made simultaneously to the example metric records (sale orders) 380 shown in FIG. 3B and to FIGS. 5A to 16.

At 410, the hypergraph generator 118 receives data regarding one or more hierarchy dimensions, which may be provided e.g. as a set of hierarchy data tables (e.g., tables 500A to 500C shown in FIGS. 5A to 5C, respectively) generated based on the metric records 380, and adds unique hierarchy identifiers for each hierarchy member. The hierarchy data tables may be provided by data view component 120 or from some other source.

As described with reference to FIG. 3B, each metric record 380 in the sales order table 350 includes data values that are associated with the hierarchy dimensions, such as date (order date 362), product (product identifier 312) and region (order region value 364). In some embodiments, the hypergraph generator 118 can receive a hierarchy data table (e.g., tables 500A to 500C shown in FIGS. 5A to 5C, respectively) for each of the hierarchy dimensions in the sales order table 350. In some embodiments, the data view component 120 can generate the hierarchy data tables based on predefined rules stored in the data view module 122. In some embodiments, the hierarchy data tables may be provided by a data analyst, e.g. via data view module 122, and/or by an administrator of the described systems.

The hierarchy data tables (e.g., tables 500A to 500C shown in FIGS. 5A to 5C, respectively) can include one or more distinct data members associated with that hierarchy dimension. The data members may be sorted either chronologically (e.g., for dates) or alphabetically, for example. Each data member of a hierarchy data table (e.g., 500A to 500C) is assigned a unique hierarchy identifier. The hierarchy identifiers assigned for each hierarchy data table (e.g., 500A to 500C) may be sequential. Example hierarchy data tables are shown in FIGS. 5A to 5C.

Figure 5A:
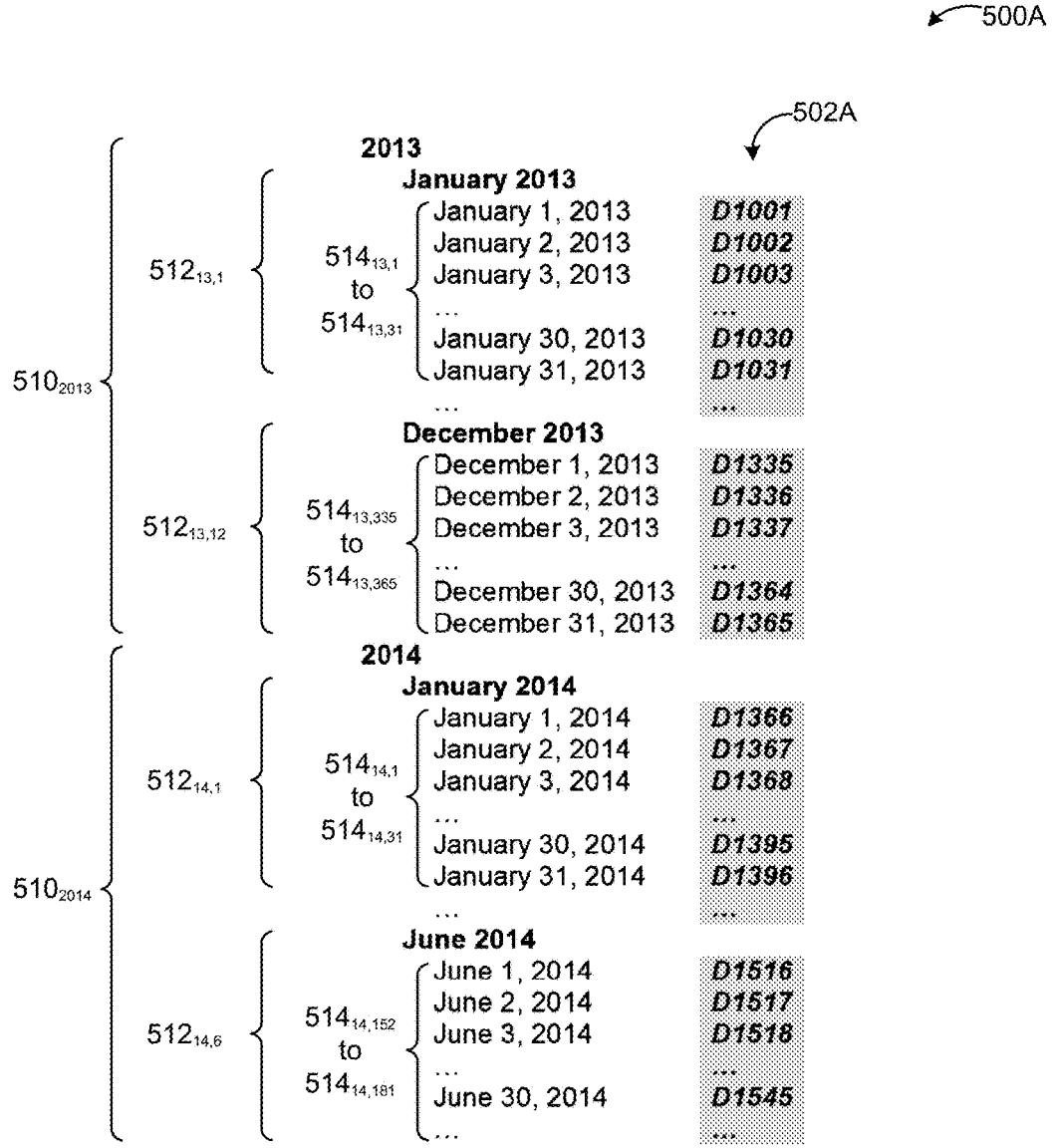
FIG. 5A is a date hierarchy table illustrating exemplary dates and corresponding example date hierarchy identifiers, in accordance with an example embodiment.

FIG. 5A is an example date hierarchy table 500A for example dates in the years 2013 and 2014. It will be understood that the dates shown in the date hierarchy table 500A are merely for illustrative purposes. Based on the data shown in FIG. 3B, the sale order entries 380 shown are within the dates between Jan. 15, 2014 to Jun. 30, 2014. The hypergraph generator 118 may receive the date hierarchy table 500A based on a predefined range of dates stored in the memory component 114 defining the scope of the date hierarchy table 500A instead of relying on the data in the metric records 380.

As shown in FIG. 5A, the date hierarchy table 500A includes three different hierarchy levels, namely a year level 510 (e.g., the year "2013" $510_{2013}$ and the year "2014" $510_{2014}$), a month level 512 (e.g., January of 2013 $512_{13,1}$; December of 2013 $512_{13,12}$; January of 2014 $512_{14,1}$; June of 2014 $512_{14,6}$, etc.), and a day level 514 (e.g., Jan. 1, 2013 referenced as $514_{13,1}$ and Jan. 31, 2013 referenced as $514_{13,31}$; Dec. 1, 2013 referenced as $514_{13,335}$ and Dec. 31, 2013 referenced as $514_{13,365}$; Jan. 1, 2014 referenced as $514_{14,1}$ and Jan. 31, 2014 referenced as $514_{14,31}$; Jun. 1, 2014 referenced as $514_{14,152}$ and Jun. 30, 2014 referenced as $514_{14,181}$; and so on). For each data member in the day level 514, the hypergraph generator 118 defines a unique date hierarchy identifier 502A for that data member. That is, hypergraph generator 118 defines a date hierarchy identifier 502A for each of the data members in the day level 514. The date hierarchy identifiers 502A can be assigned sequentially according to the dates in the day level 514 or in some other manner.

Figures 5B, 5C:
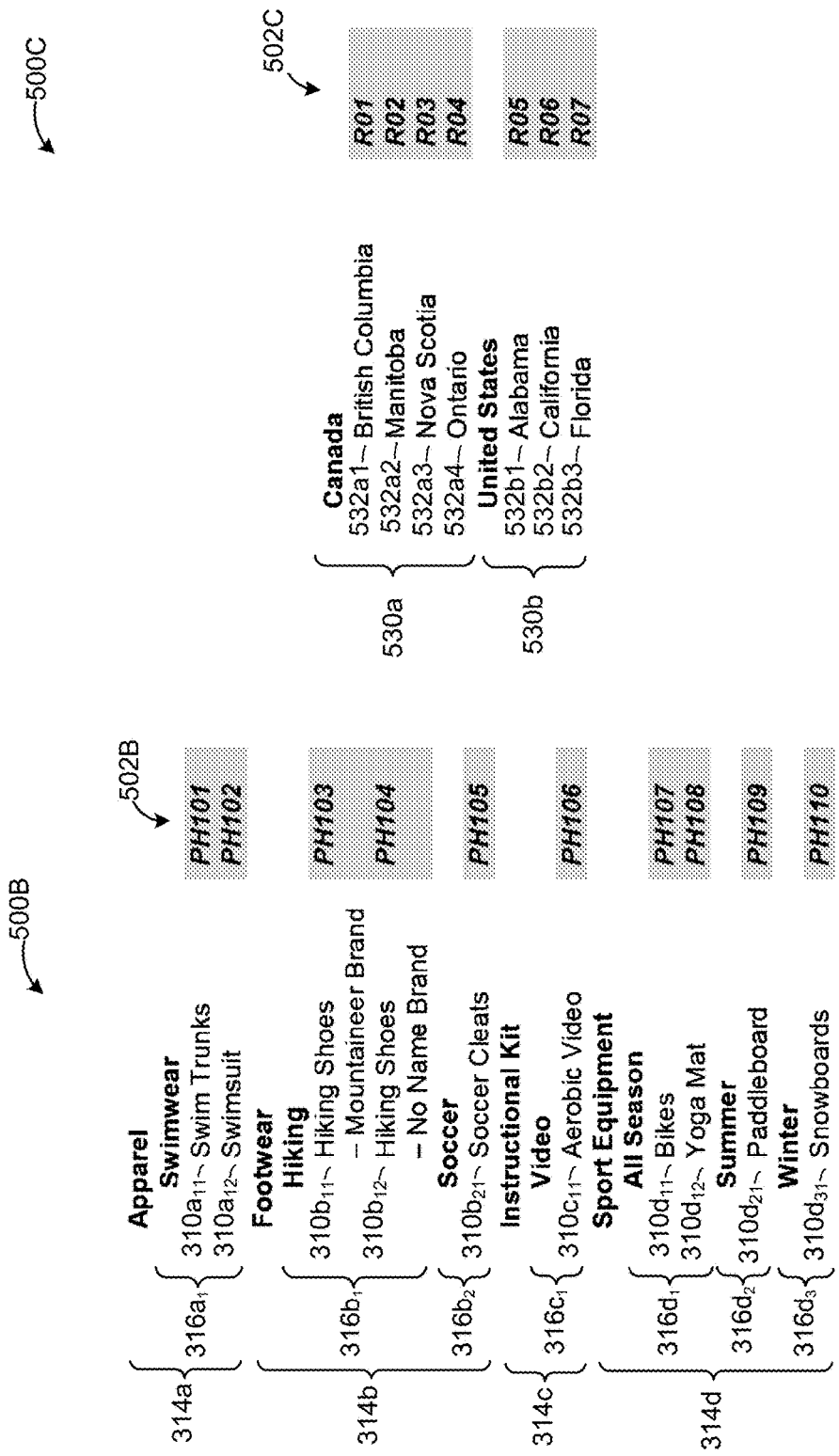
FIG. 5B is a product hierarchy table illustrating the example products listed in FIG. 3A and corresponding example product hierarchy identifiers, in accordance with an example embodiment.
FIG. 5C is a region hierarchy table illustrating example regions in which the example products listed in FIG. 3A may be sold and corresponding example region hierarchy identifiers, in accordance with an example embodiment.

FIG. 5B is an example product hierarchy table 500B for the products listed in the product table 300 of FIG. 3A. Similar to the date hierarchy table 500A, the products in the product hierarchy table 500B are merely for illustrative purposes and it will be understood that, depending on the requirements of the user of the analytical engine 110, the product hierarchy table 500B may include additional products.

As shown in FIG. 5B, the product hierarchy table 500B includes three different hierarchy levels that correspond to the product information provided in the product table 300. The hierarchy levels in the product hierarchy table 500B includes a product category level 314 (e.g., an apparel category 314a, a footwear category 314b, an instructional kit category 314c and a sport equipment category 314d), a product subcategory level 316 (e.g., a swimwear subcategory $316a_1$ for the apparel category 314a; a hiking subcategory $316b_1$ and a soccer subcategory $316b_2$ for the footwear category 314b; a video subcategory $316c_1$ for the instructional kit category 314c; an all season subcategory $316d_1$, a summer subcategory $316d_2$ and a winter subcategory $316d_3$ for the sport equipment category 314d) and a product level 310 (e.g., products $310a_{11}$, $310a_{12}$, $310b_{11}$, $310b_{12}$, $310b_{21}$, $310c_{11}$, $310d_{11}$, $310d_{12}$, $310d_{21}$, and $310d_{31}$). The hypergraph generator 118 defines a unique product hierarchy identifier 502B for each data member in the lowest hierarchy level (as shown in FIG. 5B). (The lowest hierarchy level being defined as the level in which the members of the level do not have child members) Like the date hierarchy identifiers 502A, the product hierarchy identifier 502B can be assigned sequentially according to the order of the products in the product level 310. With brief reference to FIG. 3A, for ease of exposition, the associated hypergraph product identifiers 502B for the products are shown in the product table 300; the hypergraph product identifiers 502B are not actually stored in the product table 300.

Referring now to FIG. 5C, which is an example region hierarchy table 502C for example regions. Similar to the date hierarchy table 500A, the regions provided in the region hierarchy table 502C are merely for illustrative purposes. Based on the data shown in FIG. 3B, the sale order entries 380 shown are associated with only some of the regions listed in the region hierarchy table 502C. It is possible that the sales order table 350 include sale order entries 380 for other regions in the region hierarchy table 502C that are not shown.

As shown in FIG. 5C, the region hierarchy table 500C includes two hierarchy levels, namely a country level 530 (e.g., Canada 530a and the United States 530b), a region level 532 corresponding to a province or state (e.g., British Columbia $532_{a1}$, Manitoba $532_{a2}$, Nova Scotia $532_{a3}$, Ontario $532_{a4}$, Alabama $532_{b1}$, California $532_{b2}$, and Florida $532_{b3}$). The hypergraph generator 118 defines a unique region hierarchy identifier 502C for each data member in the lowest hierarchy level (as shown in FIG. 5C). Like the date and product hierarchy identifiers 502A and 502B, the region hierarchy identifier 502C can be assigned sequentially according to the order of the regions in the region level 532.

It will be understood that further hierarchy levels may be included in each of the example hierarchy tables 500A to 500C, and the illustrated hierarchy levels are merely for illustrative purposes. For example, and without limitation, the region hierarchy table 500C may include another hierarchy level for cities.

FIG. 6 is hierarchy sales order table 600 generated based on the sales order table 350 of FIG. 3B. The hierarchy sales order table 600 is a modified version of the sales order table 350 and includes modified sale order entries 380a' to 380k'. As described, the hierarchy data values 602H can include the data values associated with the order date 362, the order region 364 and the product 310, and the measure data values 602M can include the order quantity 366 and the total sales amount 370. To generate the hierarchy sales order table 600, the hypergraph generator 118 can determine the relevant hierarchy identifiers 502A to 502C for each sale order entry 380 in the sales order and provide the modified sale order entry 380' with the relevant hierarchy identifiers 502A to 502C.

Returning to FIG. 4, at 420, for each hierarchy dimension, as represented in FIGS. 5A-5C by data tables 500A to 500C, the hypergraph generator 118 determines the number of distinct data members in the lowest hierarchy level of the respective hierarchy dimension, based on the data in the fact table (e.g. a sales order table such as the example shown in FIG. 3B) and/or data table 500A to 500C.

The hypergraph generator 118 may determine the number of distinct data members in the lowest hierarchy level of each hierarchy dimension/data table 500. For example, the lowest hierarchy level for the date hierarchy dimension/data table 500A is the day level 514, and the hypergraph generator 118 can determine the number of distinct data members in the day level 514.

As will be described with reference to 430, the hypergraph generator 118 can assign the dimension rank based on the relative number of distinct data members that are present in each hierarchy dimension/data table 500. By ranking the various hierarchy dimensions based on the relative number of distinct data members and generating the hypergraph structures 134 according to the dimension ranks, the hierarchy dimension associated with the lowest number of distinct data values can be queried prior to other hierarchy dimensions so that the scope of the query can be determined fairly early and the resources necessary for conducting the query can be prepared in advance. Alternatively, the hierarchy dimension associated with the highest number of distinct data values could be ranked highest, although it has been found that assigning the highest rank to the hierarchy dimension associated with the lowest number of distinct data values results in lower memory consumption and, accordingly, better performance.

At 430, the hypergraph generator 118 assigns each hierarchy dimension a dimension rank according to the determined number of distinct data members for the set of hierarchy dimension/data tables 500A to 500C.

The dimension rank can indicate a relative number of distinct data members between the hierarchy dimension/data tables 500A to 500C. In some embodiments, the hypergraph generator 118 may assign the dimension ranks sequentially. For example, when the hypergraph generator 118 determines, at 420, that a hierarchy dimension/data table 500 is associated with a lowest number of distinct data members, the hypergraph generator 118 can then assign the hierarchy dimension corresponding to the hierarchy dimension/data table 500 with a first dimension rank. Similarly, the hypergraph generator 118 can assign the hierarchy dimension corresponding to a hierarchy dimension/data table 500 with the greatest number of distinct data members with a last dimension rank. The hypergraph generator 118 can assign the dimension ranks to the other hierarchy dimension according to the increasing total number of distinct data members in the hierarchy dimension/data tables 500.

Referring again to the example hierarchy dimension/data tables 500A to 500C shown in FIGS. 5A to 5C, the hypergraph generator 118 can determine that the date hierarchy dimension/table 500A includes the greatest number of distinct data members in the lowest level 514. The hypergraph generator 118 can then assign the date hierarchy dimension 362 with the last dimension rank, or the third dimension rank in this example. Similarly, the hypergraph generator 118 can determine that the product hierarchy dimension/table 500B includes the second greatest number of distinct data members in the lowest level 310 in comparison with the date hierarchy dimension/table 500A and the region hierarchy dimension/table 500C. The hypergraph generator 118 can then assign the product hierarchy dimension 310 with the second last (which, in this example, is also the second) dimension rank. The hypergraph generator 118 can then assign the first dimension rank, to the region dimension 364.

At 440 and 450, the hypergraph generator 118 generates a first hypergraph tree and at least one additional hypergraph tree, respectively. The hypergraph generator 118 can, at 440, generate the first hypergraph tree for the hierarchy dimension assigned the highest dimension rank.

Continuing with the above example in respect of FIGS. 5A to 5C, the hypergraph generator 118 can assign the region hierarchy dimension 364 with the first dimension rank, the product hierarchy dimension 310 with the second dimension rank and the date hierarchy dimension 364 with the last dimension rank based on the determined number of distinct data members in each of the respective hierarchy dimension/data tables 500A to 500C. The hypergraph generator 118 can then generate the hypergraph structures 134 based on the assigned dimension ranks. For ease of exposition, the generation of example hypergraph structures will first be described with reference to hypergraph diagrams illustrated in FIGS. 7A to 7E.

Figure 7A:
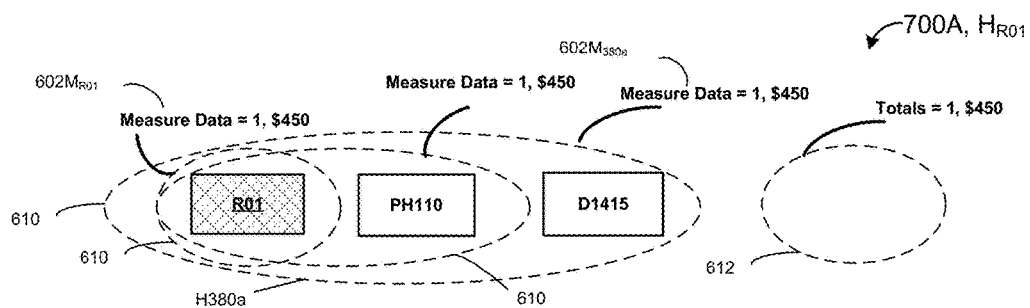
FIGS. 7A to 7C are schematic representations of example intermediary hypergraphs generated for an example date in the hierarchy sales order table of FIG. 6.
Figure 7B:
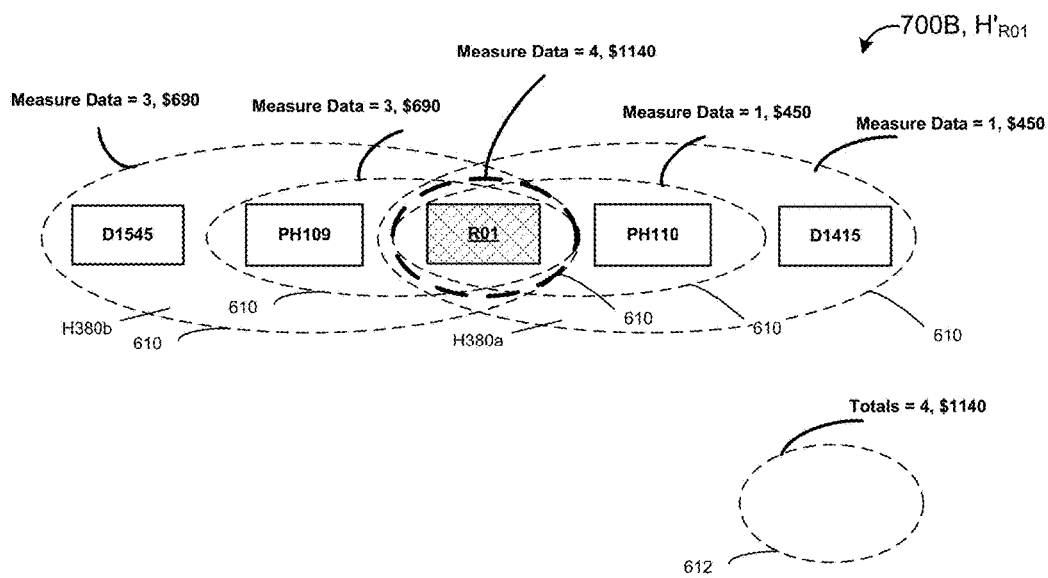
Figure 7C:
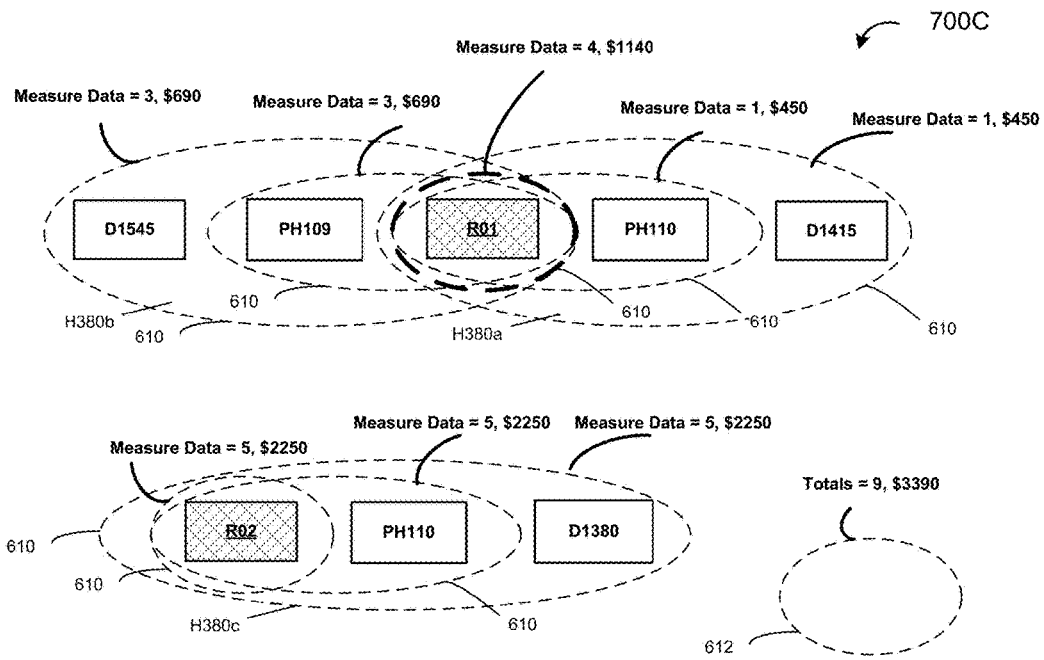

Referring first to FIGS. 7A to 7C, which illustrate intermediary hypergraph diagrams 700A to 700C, respectively, to assist in the explanation of the example embodiments. Intermediary hypergraph diagrams 700A to 700C are generated based on the region hierarchy dimension 364 in the hierarchy sales order table 600. The intermediary hypergraph diagrams 700A to 700C are generated for the metric records 380' associated with the region hierarchy identifier 502C, "R01", which corresponds to the region, British Columbia.

FIG. 7A illustrates a first intermediary hypergraph diagram 700A ($H_{R01}$) for the metric record 380a' (H380a). The first intermediary hypergraph diagram 700A includes the hierarchy data information for the metric record 380a', such as the date hierarchy identifier 502A ("D1415"), the product hierarchy identifier 502B ("PH110") and the region hierarchy identifier 502C ("R01"), and the measure data values $602M_{380a}$ for the metric record 380a'. The edges of the first intermediary hypergraph diagram 700A are shown generally referenced as 610. One edge is created for all three hierarchy members (i.e. {R01, PH110, D1415}), one edge is created for the two hierarchy members associated with the two highest ranked dimensions (i.e. {R01, PH110}), and one edge is created for the hierarchy member associated with the highest ranked dimension (i.e. {R01}). Also, an edge 612 for a set with no members is created for grand totals. Measure values are associated to each edge as a result of aggregation of the hierarchy members bounded by the edge. The first intermediary hypergraph diagram 700A only includes the data values for the metric record 380a' and so, the first intermediary measure data values are the same for each edge (i.e. the intermediary measure data value $602M_{R01}$ for the date hierarchy identifier 502A, "R01", is the same as the intermediary measure data value $602M_{380a}$ for the edge created for all three hierarchy members of metric record 380a'.

FIG. 7B is a second intermediary hypergraph diagram 700B ($H'_{R01}$) built based on the first intermediary hypergraph diagram 700A ($H_{R01}$). The second intermediary hypergraph diagram 700B ($H'_{R01}$) includes the data values associated with the metric records 380a' and 380b' since both the metric records 380a' and 380b' include data values associated with the region hierarchy identifier 502C ("R01"). The metric records 380a' and 380b', however, are associated with different product hierarchy identifiers 502B and date hierarchy members 502A. The hypergraph diagram H380b for the metric record 380b', therefore, includes the product hierarchy identifiers 502B, "PH109", and the date hierarchy identifiers 502A, "D1545". Edges of the second intermediary hypergraph diagram 700B are generally referenced as 610. One edge is created for all three hierarchy members (i.e. {R01, PH109, D1545}), and one edge is created for the two hierarchy members associated with the two highest ranked dimensions (i.e. {R01, PH109}). The edge for the hierarchy member associated with the highest ranked dimension (i.e. {R01}) already exists in this example, and the measure values associated with this edge as a result of aggregation are updated. Also, the measure values for the edge 612 for a set with no members is updated.

FIG. 7C is a third intermediary hypergraph diagram 700C that includes the data values associated with the metric records 380a', 380b', and 380c'. As shown in FIG. 7C, the metric record 380c' does not share the hierarchy identifiers 502C ("R02") with the other metric records 380a' and 380b' ("R01"). The hypergraph diagram H380c for the metric record 380c', therefore, includes the region hierarchy identifier 502C, "R02", the product hierarchy identifier 502B, "PH110" and the date hierarchy identifier 502A, "D1380". Edges of the third intermediary hypergraph diagram 700C are generally referenced as 610. One edge is created for all three hierarchy members (i.e. {R02, PH110, D1380}), one edge is created for the two hierarchy members associated with the two highest ranked dimensions (i.e. {R02, PH110}), and one edge is created for the hierarchy member associated with the highest ranked dimension (i.e. {R02}). Measure values are associated to each edge as a result of aggregation of the hierarchy members bounded by the edge. Also, the measure values for the edge 612 for the set with no members is updated.

Figure 7D:
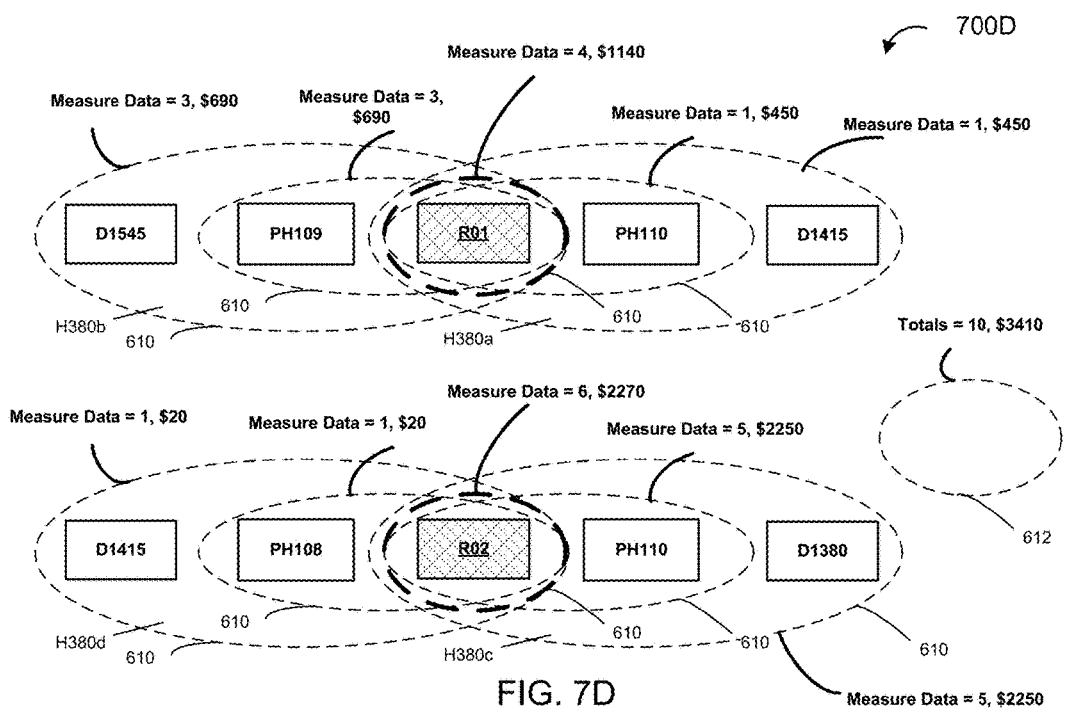
FIG. 7D is a schematic representation of an example hypergraph built from the intermediary hypergraphs of FIGS. 7A to 7C for the example date, in accordance with an example embodiment.

Continuing with the example shown in FIGS. 7A to 7C, FIG. 7D illustrates an example hypergraph diagram 700D that includes the data values associated with the metric records 380a' to 380d'. As shown in FIG. 7D, the metric record 380d' shares a common region hierarchy identifier 502C with the metric record 380c'. The metric records 380c' and 380d', however, are associated with different product hierarchy identifiers 502B and date hierarchy members 502A. Edges of the third intermediary hypergraph diagram 700C are generally referenced as 610. One edge is created for all three hierarchy members (i.e. {R02, PH108, D1415}), and one edge is created for the two hierarchy members associated with the two highest ranked dimensions (i.e. {R02, PH108}). The edge for the hierarchy member associated with the highest ranked dimension (i.e. {R02}) already exists in this example, and the measure values associated with this edge as a result of aggregation are updated. Also, the measure values for the edge 612 for a set with no members is updated.

Figure 7E:
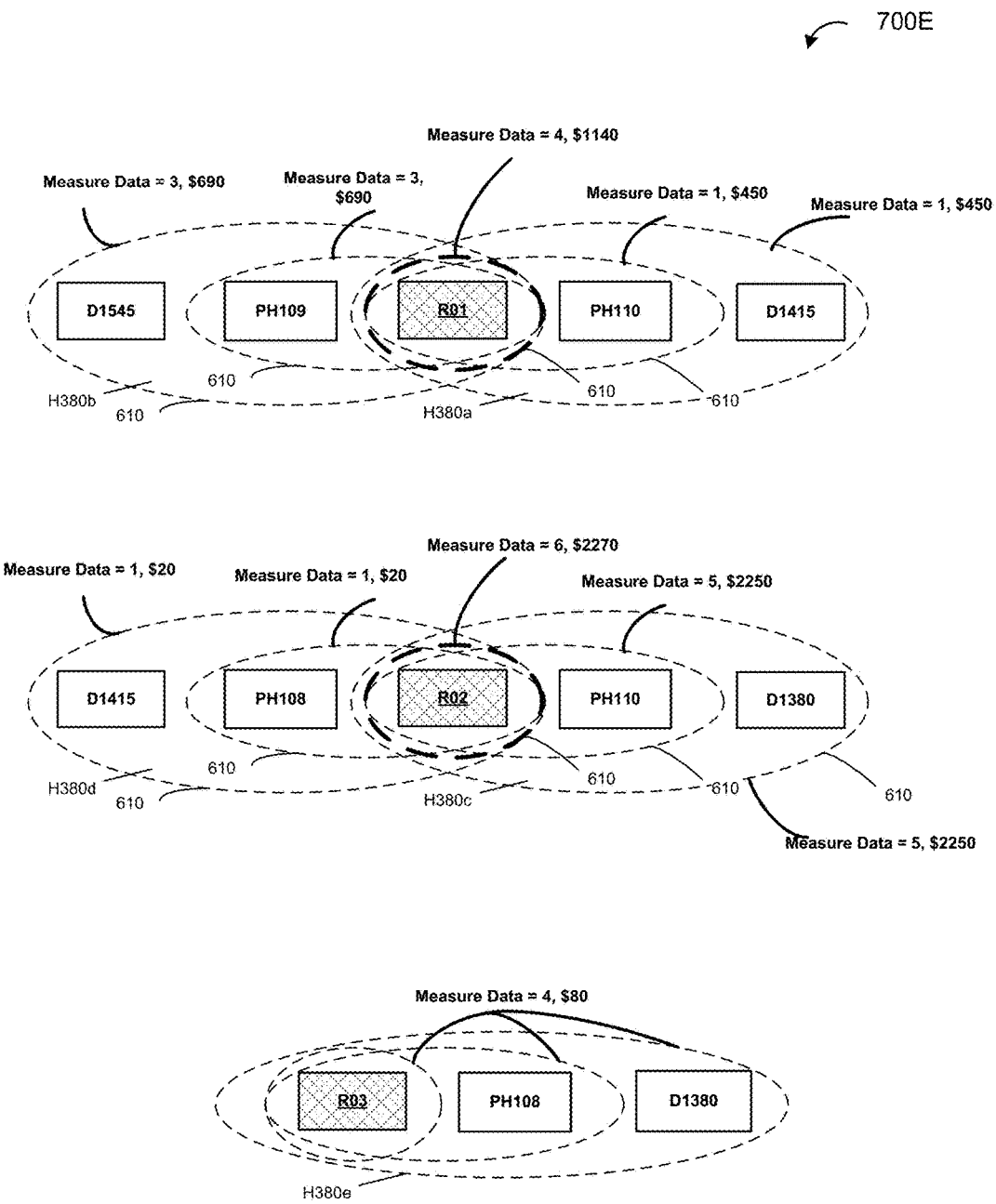
FIG. 7E is a schematic representation of an example hypergraph generated based on the dates in the hierarchy sales order table of FIG. 6, in accordance with an example embodiment.
Figure 7E:
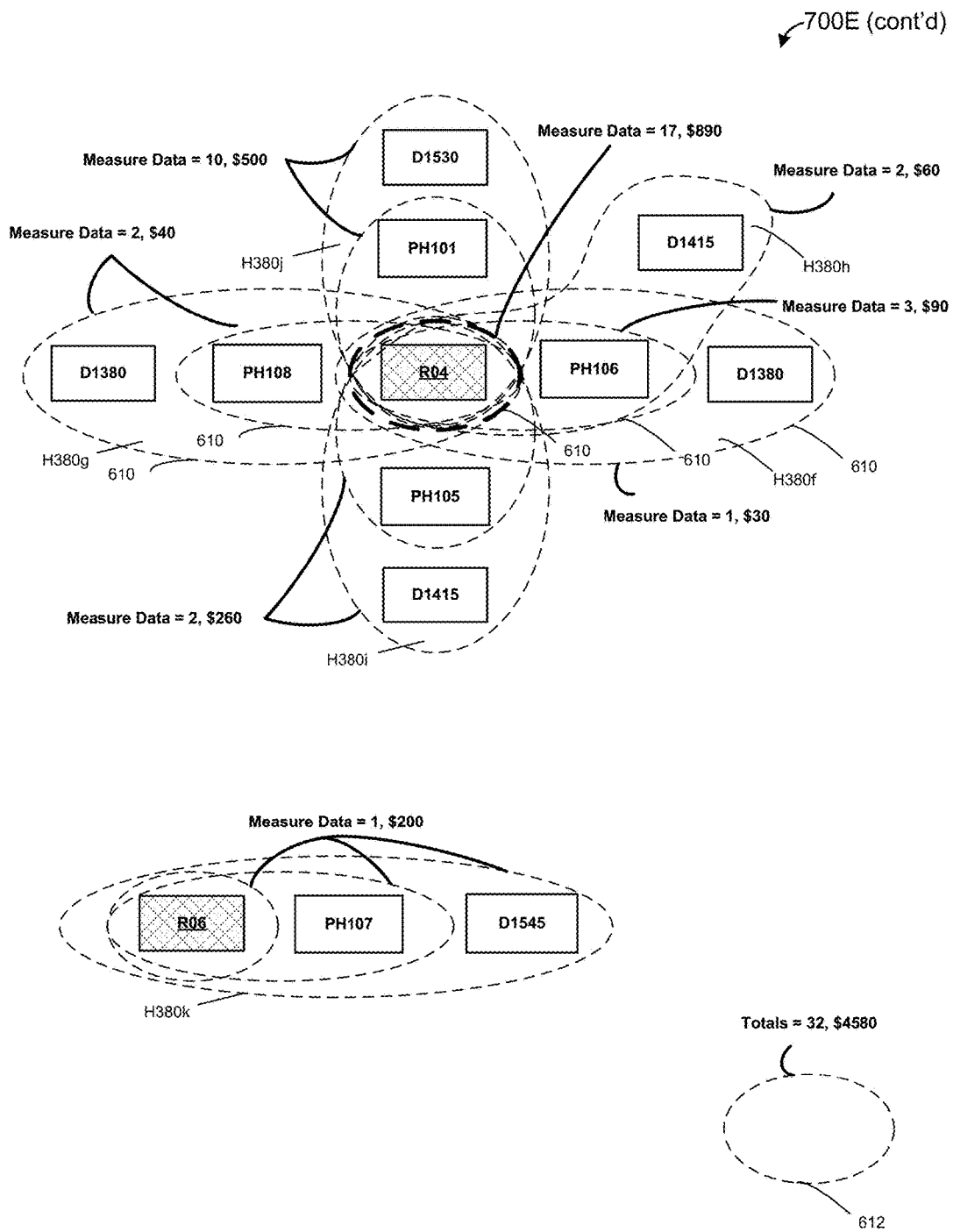

FIG. 7E illustrates an example hypergraph diagram 700E generated based on the region hierarchy dimension 364 in the hierarchy sales order table 600. As shown, the hypergraph diagram 700E includes the hypergraph diagram 700D generated for the metric records 380' associated with the region hierarchy identifiers 502C, "R01" and "R02" (as shown in FIG. 7D); a hypergraph diagram generated for the metric records 380' associated with the region hierarchy identifier 502C, "R03"; a hypergraph diagram generated for the metric records 380' associated with the region hierarchy identifier 502C, "R04"; and a hypergraph diagram generated for the metric records 380' associated with the region hierarchy identifier 502C, "R06". Measure values are associated to each edge as a result of aggregation of the hierarchy members bounded by the edge. Also, the measure values for the edge 612 for the set with no members is updated.

The hypergraph generator 118 may generate a first hypergraph tree 134' representative of the hypergraph structure illustrated using hypergraph diagram 700E. Example first hypergraph trees 134' and 1100 will be described with reference to FIGS. 10 and 11.

At 450, the hypergraph generator 118 can generate one or more additional hypergraph trees for the hierarchy dimension assigned a lower dimension rank than the highest dimension rank. That is, each additional hypergraph tree generated can uniquely correspond to a different hierarchy dimension and any such additional hypergraph trees can be generated in the order of their dimension rank.

The hypergraph diagram 700E shown in FIG. 7E is associated with the first dimension rank since the hypergraph diagram is arranged according to the region hierarchy dimension 364, which was assigned the first dimension rank in the illustrated example. The hypergraph generator 118 may, in some embodiments, generate a second hypergraph tree representative of a hypergraph structure based on the second dimension rank, which, in the illustrated example, is the product hierarchy dimension 310. For the hypergraph structure generated based on the product hierarchy dimension 310 (illustrated using hypergraph diagrams shown in FIGS. 8A-8D), the hypergraph generator 118 can generate the respective hypergraph structure without involving the region values in the region hierarchy dimension 364. Instead, the hypergraph generator 118 can generate the product hypergraph structures with respect to the product hierarchy dimension 310 and the date hierarchy dimension 362.

Figure 8A:
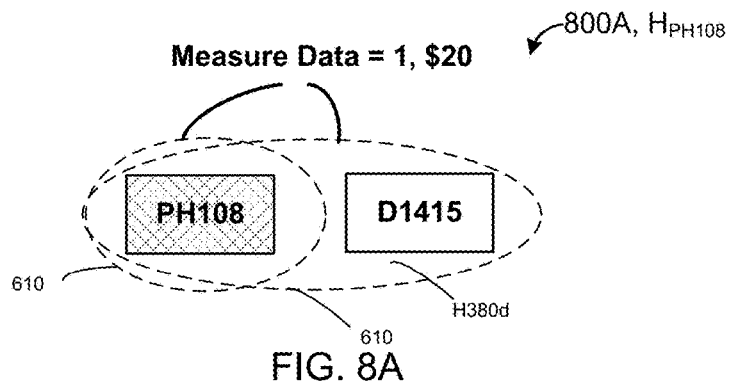
FIGS. 8A and 8B are schematic representations of example intermediary hypergraphs generated for an example product in the hierarchy sales order table of FIG. 6.
Figure 8B:
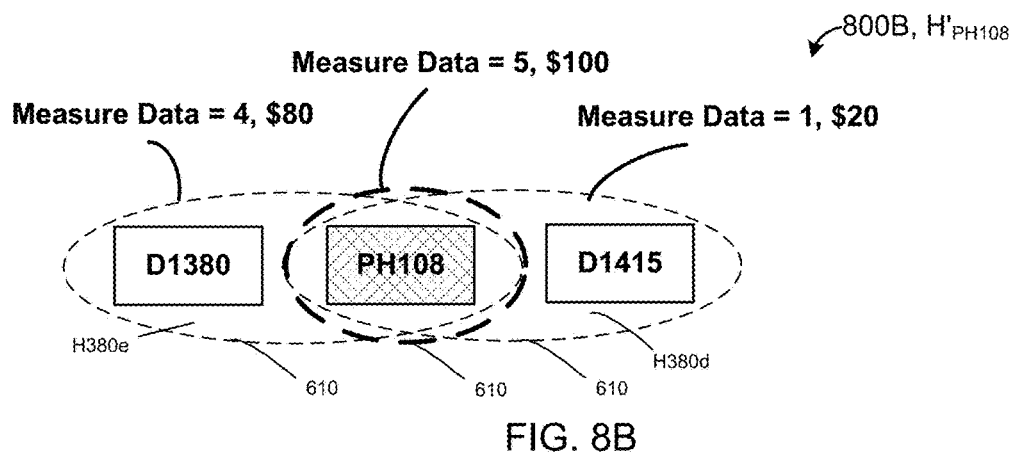

Referring now to FIGS. 8A and 8B, which illustrate intermediary hypergraph diagrams 800A and 800B, respectively, generated based on the product hierarchy dimension 310 in the hierarchy sales order table 600. The intermediary hypergraph diagrams 800A and 800B are generated for the metric records 380' associated with the product hierarchy identifier 502B, "PH108", which corresponds to the product, "Yoga Mat".

FIG. 8A illustrates a first intermediary hypergraph diagram 800A ($H_{PH108}$) for the metric record 380d'. The first intermediary hypergraph diagram 800A includes only some of the hierarchy data information for the metric record 380d', such as the product hierarchy identifier 502B ("PH108") and the date hierarchy identifier 502A ("D1415"). The edges of the first intermediary hypergraph diagram 800A are shown generally referenced as 610. One edge is created for both hierarchy members (i.e. {PH108, D1415}), and one edge is created for the hierarchy member associated with the highest ranked dimension (i.e. {PH108}). (A 'grand totals' set with no members is created only once for all of the hypergraph structures; as in this example the grand totals set was created with respect to the region hypergraph structure (as shown in FIGS. 7A-7E), it does not need to be created again.) Measure values are associated to each edge as a result of aggregation of the hierarchy members bounded by the edge. The first intermediary hypergraph diagram 800A only includes the data values for the metric record 380b' and so, the first intermediary measure data values are the same for each edge (i.e. the intermediary measure data value for the product hierarchy identifier 502B, "PH108", is the same as the intermediary measure data value for the edge created for both hierarchy members of metric record 380d' being considered for first intermediary hypergraph diagram 800A.

FIG. 8B is a second intermediary hypergraph diagram 800B ($H'_{PH108}$) built based on the first intermediary hypergraph diagram 800A ($H'_{PH108}$). The second intermediary hypergraph diagram 800B ($H'_{PH108}$) includes the data values associated with the metric records 380d' and 380e' since both the metric records 380d' and 380e' include data values associated with the product hierarchy identifier 502B, "PH108". As shown in FIG. 8B, the metric records 380d' and 380e' do not share a common date hierarchy identifier 502A and so, different date hierarchy identifiers 502A, namely "D1415" and "D1380", are provided, respectively. Edges of the second intermediary hypergraph diagram 800B are generally referenced as 610. One edge is created for the two hierarchy members (i.e. {PH108, D1380}). The edge for the hierarchy member associated with the highest ranked dimension (i.e. {PH108}) already exists in this example, and the measure values associated with this edge as a result of aggregation are updated. Also, the measure values for the edge 612 for a set with no members is updated.

Figure 8C:
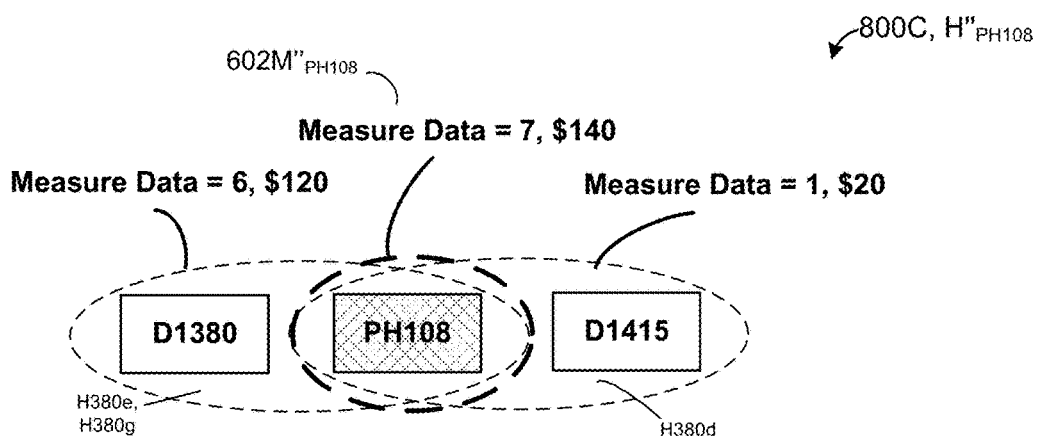
FIG. 8C is a schematic representation of an example hypergraph built from the intermediary hypergraphs of FIGS. 8A and 8B for the example product, in accordance with an example embodiment.

Continuing with the example shown in FIGS. 8A and 8B, FIG. 8C illustrates an example hypergraph diagram 800C ($H''_{PH108}$) built for the product hierarchy identifier 502B, "PH108".

FIG. 8C is built based on the second intermediary hypergraph diagram 800B ($H'_{PH108}$) and includes the data values associated with the metric records 380d', 380e' and 380g' since the metric records 380d', 380e' and 380g' include data values associated with the product hierarchy identifier 502B, "PH108". In this case, the metric record 380g' shares a date hierarchy identifier 502A with metric record 380e', and so, the hypergraph diagram 800C does not involve the creation of new edges. The measure values associated with the edges as a result of aggregation are updated, as is the measure values for the edge 612.

The measure data value 602M″$_{PH108}$ for the hypergraph diagram 800C is now the measure data value for the product hierarchy identifier 502B, "PH108", for the example data shown in FIG. 6 since no other metric record in the hierarchy sales order table 600 is associated with the product hierarchy identifier 502B, "PH108".

Figure 8D:
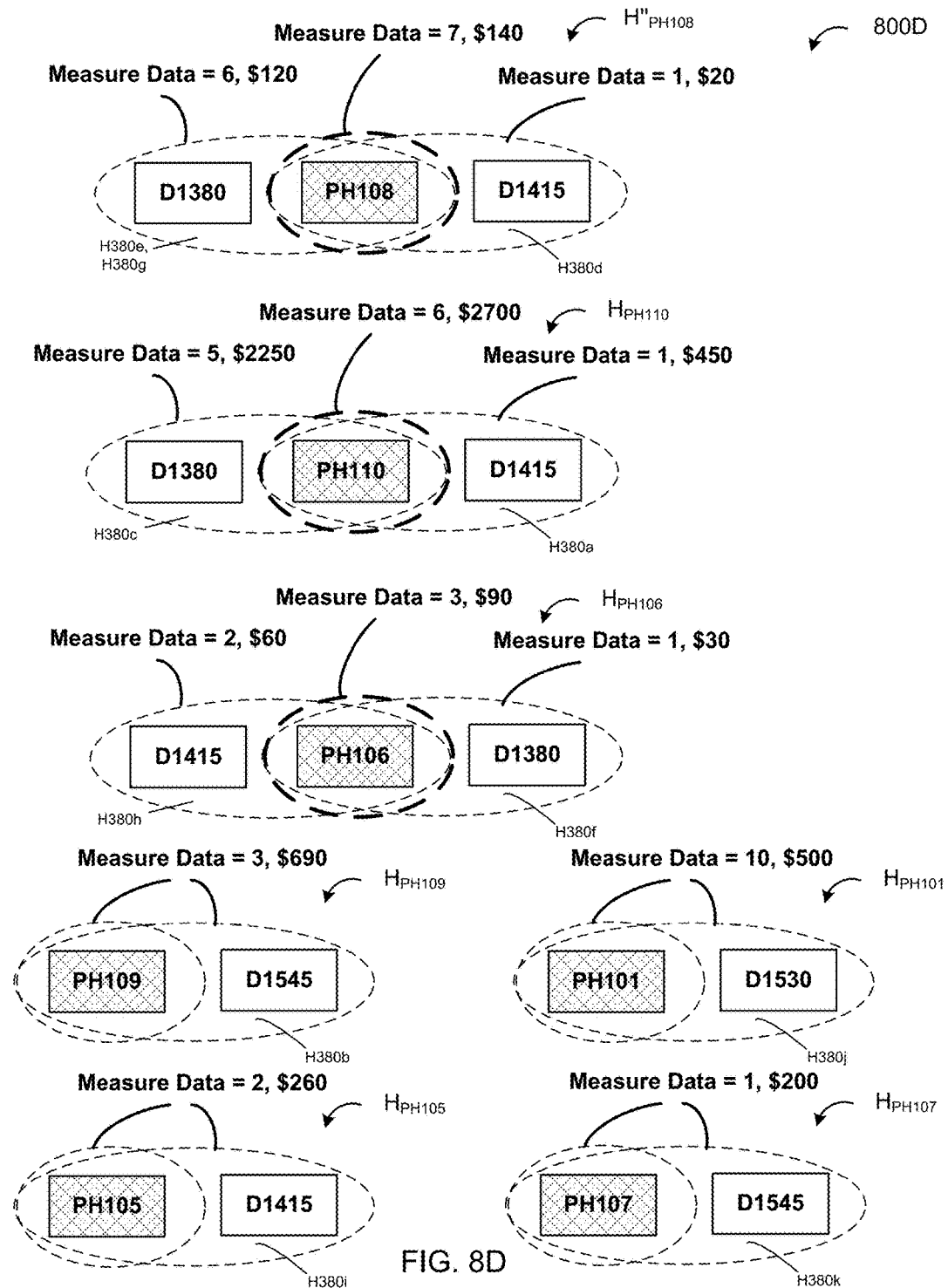
FIG. 8D is a schematic representation of an example hypergraph generated based on the products in the hierarchy sales order table of FIG. 6, in accordance with an example embodiment.

FIG. 8D illustrates an example hypergraph diagram 800D generated based on the product hierarchy dimension 310 in the hierarchy sales order table 600. As shown, the hypergraph diagram 800D includes the hypergraph diagram 800C (H′$_{PH108}$) generated for the metric records 380′ associated with the product hierarchy identifier 502B, "PH108" (as shown in FIG. 8C); a hypergraph diagram (H$_{PH101}$) generated for the metric records 380′ associated with the product hierarchy identifier 502B, "PH101"; a hypergraph diagram (H$_{PH105}$) generated for the metric records 380′ associated with the product hierarchy identifier 502B, "PH105"; a hypergraph diagram (H$_{PH106}$) generated for the metric records 380′ associated with the product hierarchy identifier 502B, "PH106"; a hypergraph diagram (H$_{PH107}$) generated for the metric records 380′ associated with the product hierarchy identifier 502B, "PH107"; a hypergraph diagram (H$_{PH109}$) generated for the metric records 380′ associated with the product hierarchy identifier 502B, "PH109"; and a hypergraph diagram (H$_{PH110}$) generated for the metric records 380′ associated with the product hierarchy identifier 502B, "PH110". Measure values are associated to each edge as a result of aggregation of the hierarchy members bounded by the edge. Also, the measure values for the edge 612 for the set with no members are updated.

The hypergraph diagram 800D shown in FIG. 8D is associated with the second dimension rank since the hypergraph diagram is arranged according to the product hierarchy dimension 310, unlike the hypergraph diagram 700E which is arranged according to the first dimension rank, that is, in this example, the region hierarchy dimension 364. The hypergraph generator 118 may generate a second hypergraph tree 134″ representative of the hypergraph structure illustrated using hypergraph diagram 800D. Example second hypergraph trees 134″ and 1300 will be described with reference to FIGS. 12 and 13.

The hypergraph generator 118 may, in some embodiments, continue to generate additional hypergraph trees representative of hypergraph structures for other dimension ranks. For example, the hypergraph generator 118 can generate a third hypergraph tree representative of a hypergraph structure for the third dimension rank, which, in this example, is also the last dimension rank the hypergraph generator 118 assigned to the date hierarchy dimension 362. For the hypergraph diagram structure based on the date hierarchy dimension 362, the hypergraph generator 118 can generate the date hypergraph structure without involving the region values in the region hierarchy dimension 362 and the product values in the product hierarchy dimension 310. Instead, the hypergraph generator 118 can generate the hypergraph structures with respect to the date hierarchy dimension 362 only.

Figure 9:
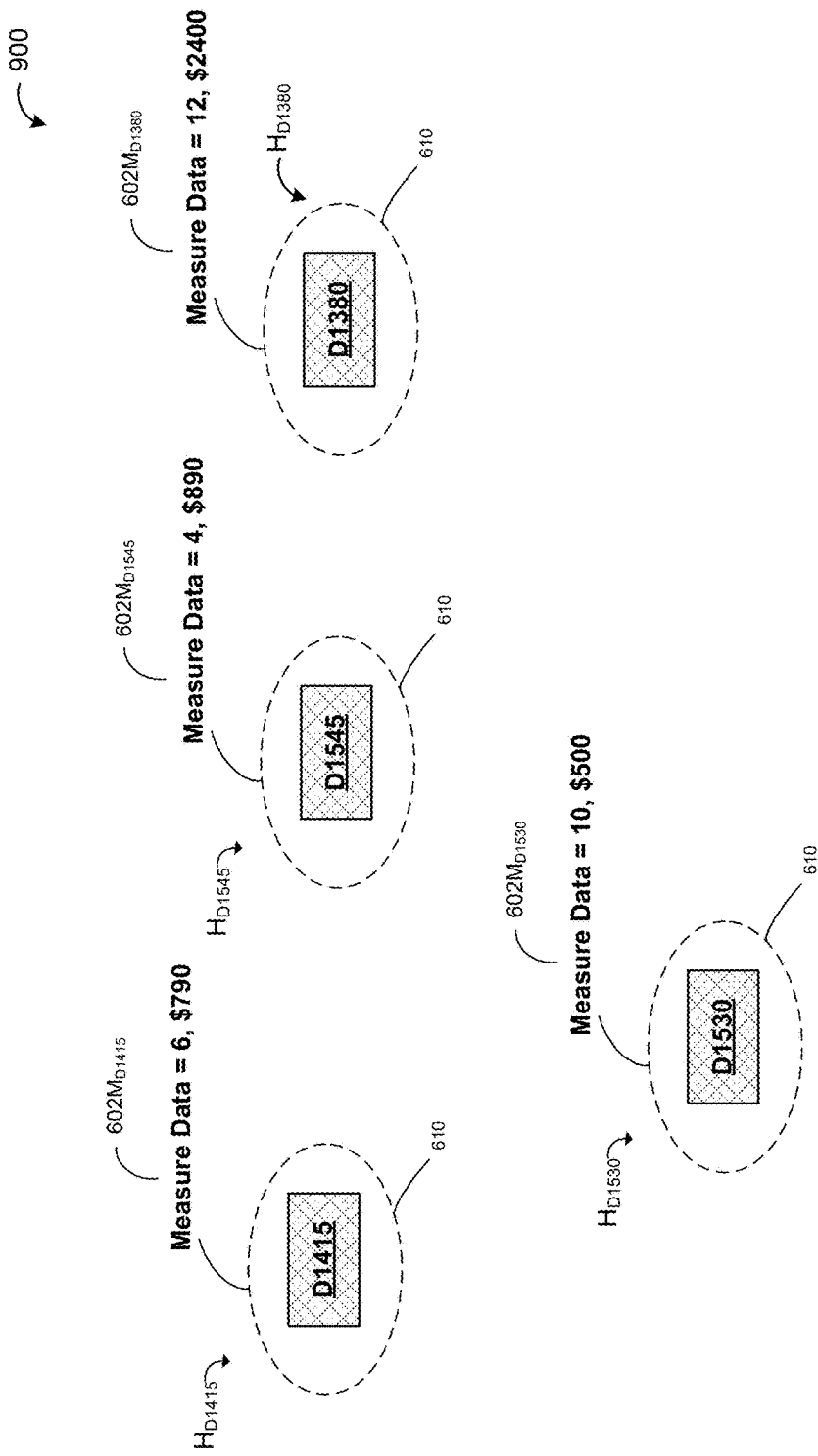
FIG. 9 is a schematic representation of an example hypergraph generated for the regions in the hierarchy sales order table of FIG. 6, in accordance with an example embodiment.

FIG. 9 illustrates an example hypergraph diagram 900 generated based on the date hierarchy dimension 362 in the hierarchy sales order table 600. As shown, the hypergraph diagram 900 includes a hypergraph diagram (H$_{D1415}$) generated for the metric records 380′ associated with the date hierarchy identifier 502A, "D1415"; a hypergraph diagram (H$_{D1545}$) generated for the metric records 380′ associated with the date hierarchy identifier 502A, "D1545"; a hypergraph diagram (H$_{D1380}$) generated for the metric records 380′ associated with the date hierarchy identifier 502A, "D1380"; and a hypergraph diagram (H$_{D1530}$) generated for the metric records 380′ associated with the date hierarchy identifier 502A, "D1530". Also, an edge 612 for a set with no members is created for grand totals. Measure values are associated to each edge as a result of aggregation of the hierarchy members bounded by the edge. The measure data values 602M$_{D1415}$, 602M$_{D1545}$, 602M$_{D1380}$, and 602M$_{D1530}$ for each of the hypergraph diagrams H$_{D1415}$, H$_{D1545}$, H$_{D1380}$, and H$_{D1530}$, respectively, are also provided in FIG. 9.

The hypergraph generator 118 may generate a third hypergraph tree 134‴. Example third hypergraph trees 134‴ and 1500 will be described with reference to FIGS. 14 and 15.

As described, hypergraph trees 134 are generated directly from the data in the hierarchy sales order table 600. The hypergraph generator 118 may generate hypergraph trees 134 according to the dimension ranks assigned to the various hierarchy dimensions.

Figure 10:
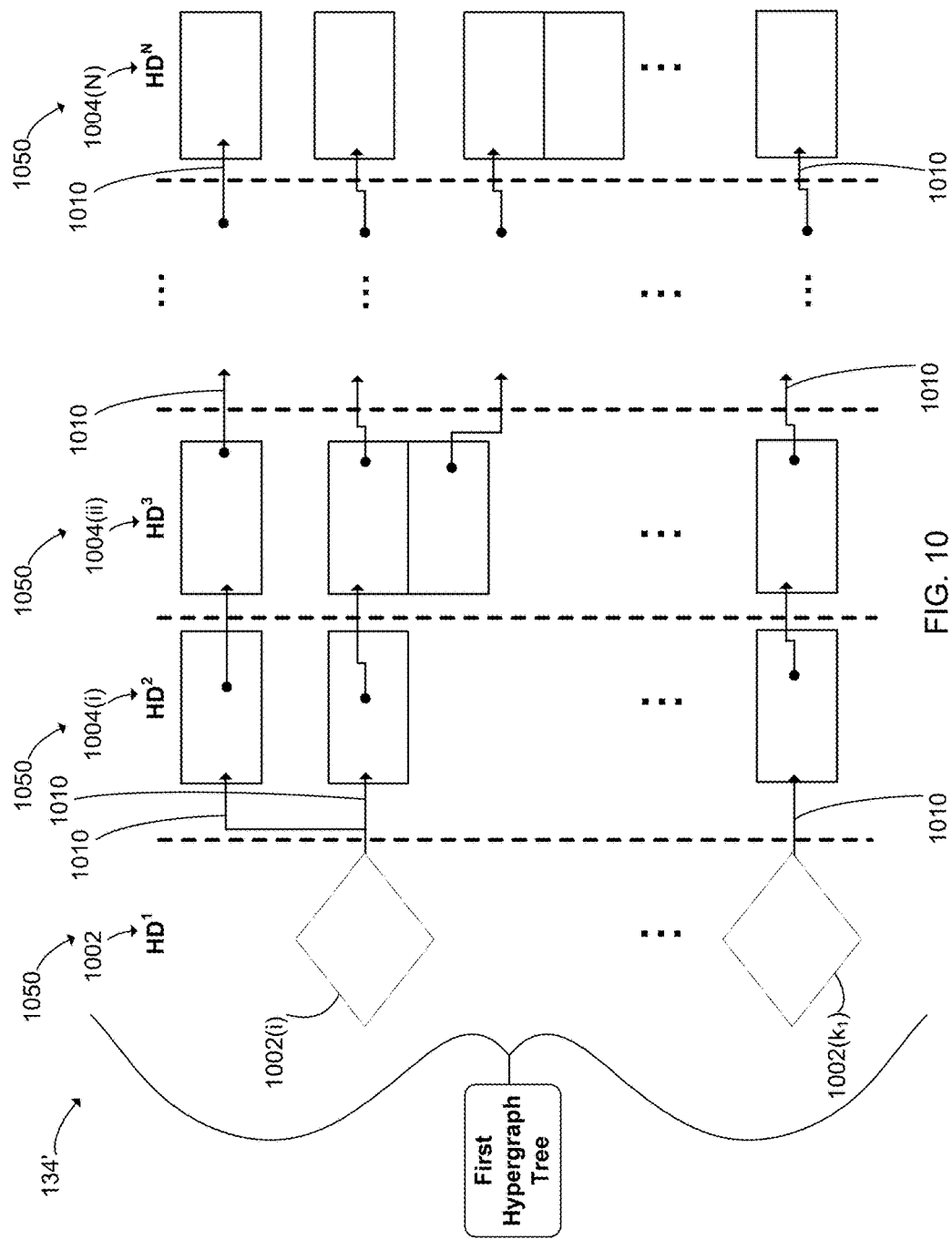
FIG. 10 is a schematic diagram of an example first hypergraph tree generated for an example dataset based on a first hierarchy dimension of the example dataset, in accordance with an example embodiment.

FIG. 10 illustrates an example first hypergraph tree 134′. The hypergraph tree 134′ is provided for metric records that include hierarchy data values for 1 to N different hierarchy dimensions. Each hierarchy dimension is associated with a tier 1050 of the first hypergraph tree 134′, or a hypergraph node 1002, 1004 within the first hypergraph tree 134′. The first hierarchy dimension (HD$^1$) can be represented with an initial node 1002 in a tier 1050, as shown in FIG. 10, and the subsequent hierarchy dimensions (HD$^2$ to HD$^N$) can be represented with subsequent nodes 1004(i) to 1004(N) in the respective tiers 1050. The order in which the initial nodes 1002 and the subsequent nodes 1004 are arranged may follow the sequence of the dimension ranks assigned to the respective hierarchy dimensions.

As described with respect to the hypergraph diagrams shown in FIGS. 7A to 9, the hypergraph generator 118 can assign the dimension ranks based on the relative number of distinct data members in the hierarchy dimension/data tables 500A to 500C. That is, the hypergraph generator 118 can assign the hierarchy dimension associated with the hierarchy dimension/data tables, such as 500A to 500C, with the fewest number of distinct data members with a first dimension rank, and so on.

As shown in FIG. 10, a different initial node 1002, is generated for each distinct data value so that each initial node 1002 corresponds to a distinct data value in the first hierarchy dimension (HD$^1$). Therefore, for metric records with a k$_1$ number of distinct data values in the first hierarchy dimension, a corresponding number of k$_1$ initial nodes 1002(i) to 1002(k$_1$) will be generated by the hypergraph generator 118. Each tier 1050 of subsequent nodes 1004 that link from the initial nodes 1002 will correspond to the data values in the respective hierarchy dimensions according to the assigned dimension ranks. Example links 1010 are shown in FIG. 10. It will be understood that, for ease of exposition, only some of the links 1010 shown in FIG. 10 are labeled with the reference numeral.

Figure 11:
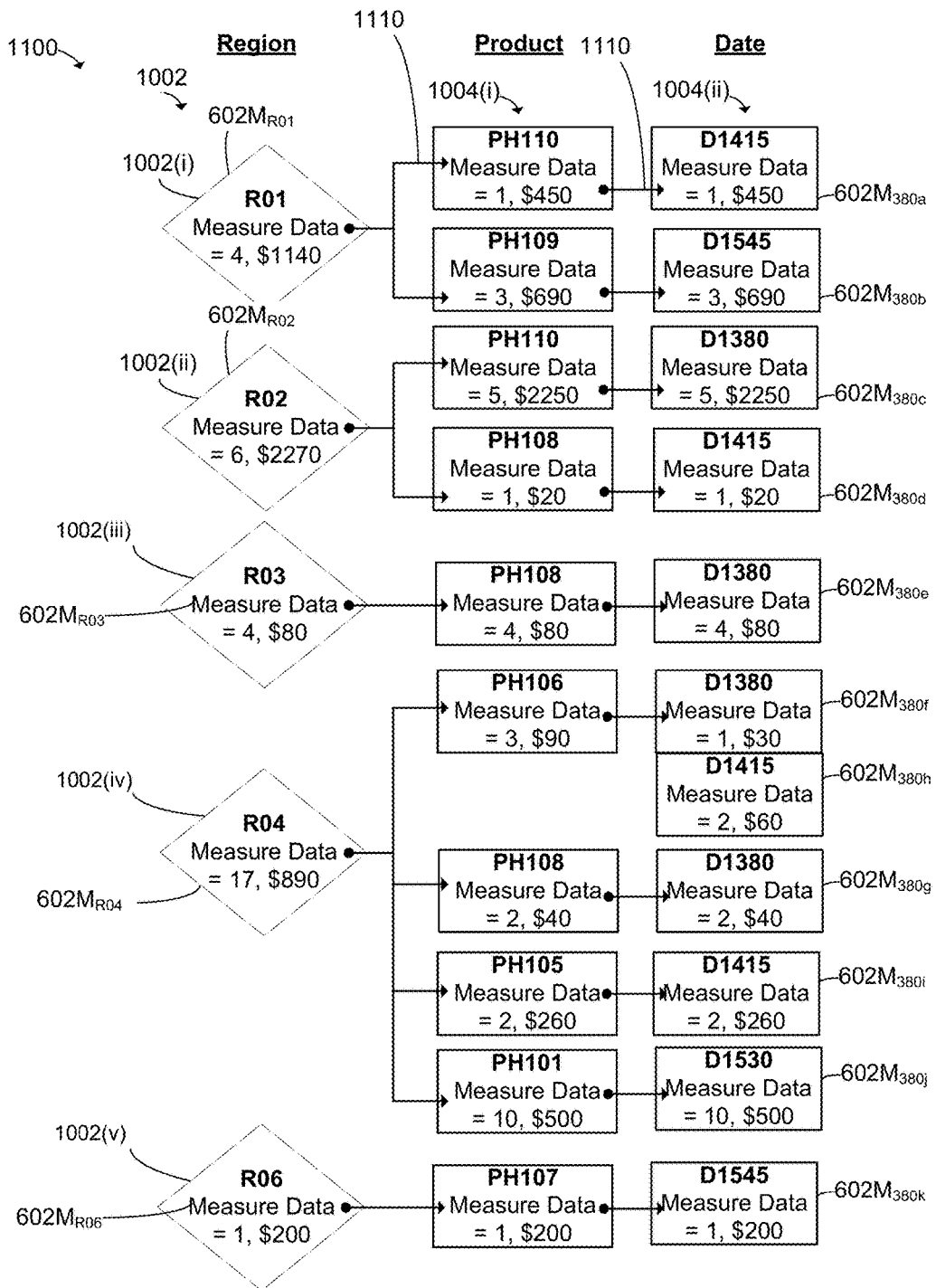
FIG. 11 is a schematic diagram of an example hypergraph tree generated for the sales order entries in the hierarchy sales order table of FIG. 6 based on the first hierarchy dimension of the sales order entries, in accordance with an example embodiment.

FIG. 11 illustrates an example first hypergraph tree 1100 corresponding to the hypergraph diagram 700E of FIG. 7E. The first hypergraph tree 1100 is generated based on the data in the hierarchy sales order table 600. The first hypergraph tree 1110 includes the initial nodes 1002(i) to 1002(iv) and the first hypergraph tree 1110 includes three hierarchy dimensions, namely the region hierarchy dimension 364, the product hierarchy dimension 310 and the date hierarchy dimension 362. Since the first hierarchy dimension determined for the metric records 380' of the hierarchy sales order table 600 is the region hierarchy dimension 364, the initial nodes 1002 correspond to the hierarchy and measure data values associated with the region hierarchy dimension 364.

As shown in FIG. 11, the initial node 1002(*i*) corresponds to the region hierarchy identifier 502C, "R01". From the hierarchy sales order table 600, the hypergraph generator 118 can determine that the metric records 380' with a data value associated with the region hierarchy identifier 502C, "R01", includes metric records 380*a*' and 380*b*'. The initial node 1002(*i*) may also include an edge weighting that includes a sum of the measure data values of the metric records 380*a*' to 380*b*' ($602M_{R01}$). The hypergraph generator 118 may determine the measure data value ($602M_{R01}$) for the region hierarchy identifier 502C, "R01", by retrieving the relevant metric records, namely metric records 380*a*' to 380*b*' in this example, and generating a sum of the measure data values associated with each of the metric records 380*a*' to 380*b*'.

Nodes 1002 may be stored in a balanced search tree (e.g. a B+ tree). Nodes 1004(*i*) may be assigned to the same B+ tree if they share the same "previous" hierarchy member (e.g. the two children for 1002(*i*) shown in FIG. 10). Alternatively, a sequence of B+ trees may be joined—for example, all trees below 1002(*i*) may be joined in one B+ tree.

Still referring to the initial node 1002(*i*), the hypergraph generator 118 can then generate first subsequent nodes 1004(*i*) for the hierarchy dimension assigned the second dimension rank, which, in the example hierarchy sales order table 600 of FIG. 6, is the product hierarchy dimension 310. The hypergraph generator 118 can then link the first subsequent nodes to the initial node 1002(*i*), as shown with the links in FIG. 11. As shown in FIG. 11, two different first subsequent nodes 1004(*i*) link from the initial node 1002(*i*) since the metric records 380*a*' and 380*b*' are associated with two different product hierarchy identifiers 502B, namely "PH110", and "PH109". Each of the first subsequent nodes 1004(*i*) may also be associated with a corresponding first measure data values. Example links 1110 are shown in FIG. 11. It will be understood that, for ease of exposition, only some of the links 1110 shown in FIG. 11 are labeled with the reference numeral.

The hypergraph generator 118 can then generate the second subsequent nodes 1004(*ii*) for the hierarchy dimension assigned the third dimension rank, which, in the example hierarchy sales order table 600 of FIG. 6, is the date hierarchy dimension 362, and link the second subsequent nodes 1004(*ii*) to the respective first subsequent nodes 1004(*i*).

The other initial nodes 1002(*ii*) to 1002(*iv*) are generated for the remaining data values in the hierarchy sales order table 600. As shown in FIG. 11, the hypergraph generator 118 generates the initial node 1002(*ii*) for the region hierarchy identifier 502C, "R02"; the initial node 1002(*iii*) for the region hierarchy identifier 502C, "R03"; the initial node 1002(*iv*) for the region hierarchy identifier 502C, "R04"; and the initial node 1002(*v*) for the region hierarchy identifier 502C, "R06". Similar to the initial node 1002(*i*), the hypergraph generator 118 can generate the first and second subsequent nodes 1004(*i*) and 1004(*ii*) for each of the initial nodes 1002(*ii*) to 1002(*iv*) based on the data values in the hierarchy sales order table 600.

As shown in FIG. 11, the fourth hypergraph tree 1002(*iv*) includes five different second subsequent nodes 1004(*ii*). However, the metric records 380*f* to 380*j*' are not associated with five different date hierarchy identifiers 502A. Instead, the hypergraph generator 118 can determine that the first subsequent node 1004(*i*) associated with the product hierarchy identifier 502B, "PH106", is associated with two different date hierarchy identifiers 502A, namely "D1380" and "D1415". Each of the second subsequent nodes 1004(*ii*) is associated with a corresponding measure data value, namely $602M_{380f}$, $602M_{380g}$, $602M_{380h}$, $602M_{380i}$, and $602M_{380j}$, as provided in the hierarchy sales order table 600.

The hypergraph generator 118 may, in some embodiments, generate an additional hypergraph tree based on another hierarchy dimension. That is, the hypergraph generator 118 may generate an additional hypergraph tree for a hierarchy dimension assigned a hierarchy dimension rank subsequent to the first dimension rank.

Figure 12:
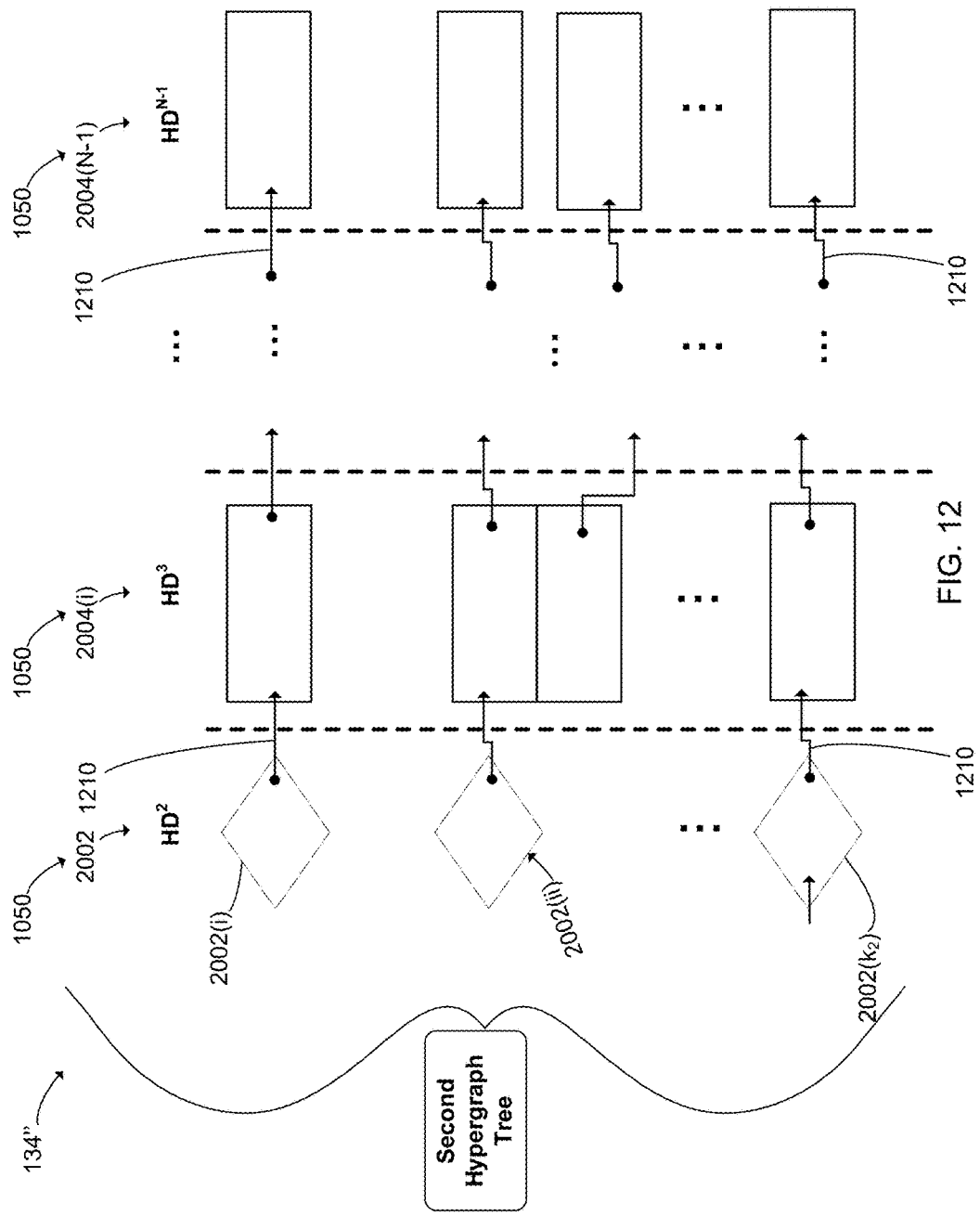
FIG. 12 is a schematic diagram of an example second hypergraph tree generated for the example dataset for which the schematic diagram of FIG. 10 was generated, and based on a second hierarchy dimension of the example dataset, in accordance with an example embodiment.

For example, as shown in FIG. 12, the hypergraph generator 118 may generate a second hypergraph tree 134" for the hierarchy dimension assigned the second dimension rank. The initial nodes 2002 in the hypergraph trees 134" now correspond to a distinct data value in the second hierarchy dimension ($HD^2$), and the subsequent hierarchy dimensions ($HD^3$ to $HD^{N-1}$) can be represented with subsequent nodes 2004(*i*) to 2004(N-1). Therefore, for metric records with a $k_2$ number of distinct data values in the second hierarchy dimension, a corresponding number of $k_2$ initial nodes 2002(*i*) to 2002($k_2$) will be generated by the hypergraph generator 118. Each tier 1050 of subsequent nodes 2004 that links from the initial nodes 2002 will correspond to the data values in the respective hierarchy dimensions according to the assigned dimension ranks. Example links 1210 are shown in FIG. 12. It will be understood that, for ease of exposition, only some of the links 1210 shown in FIG. 12 are labeled with the reference numeral.

Figure 13:
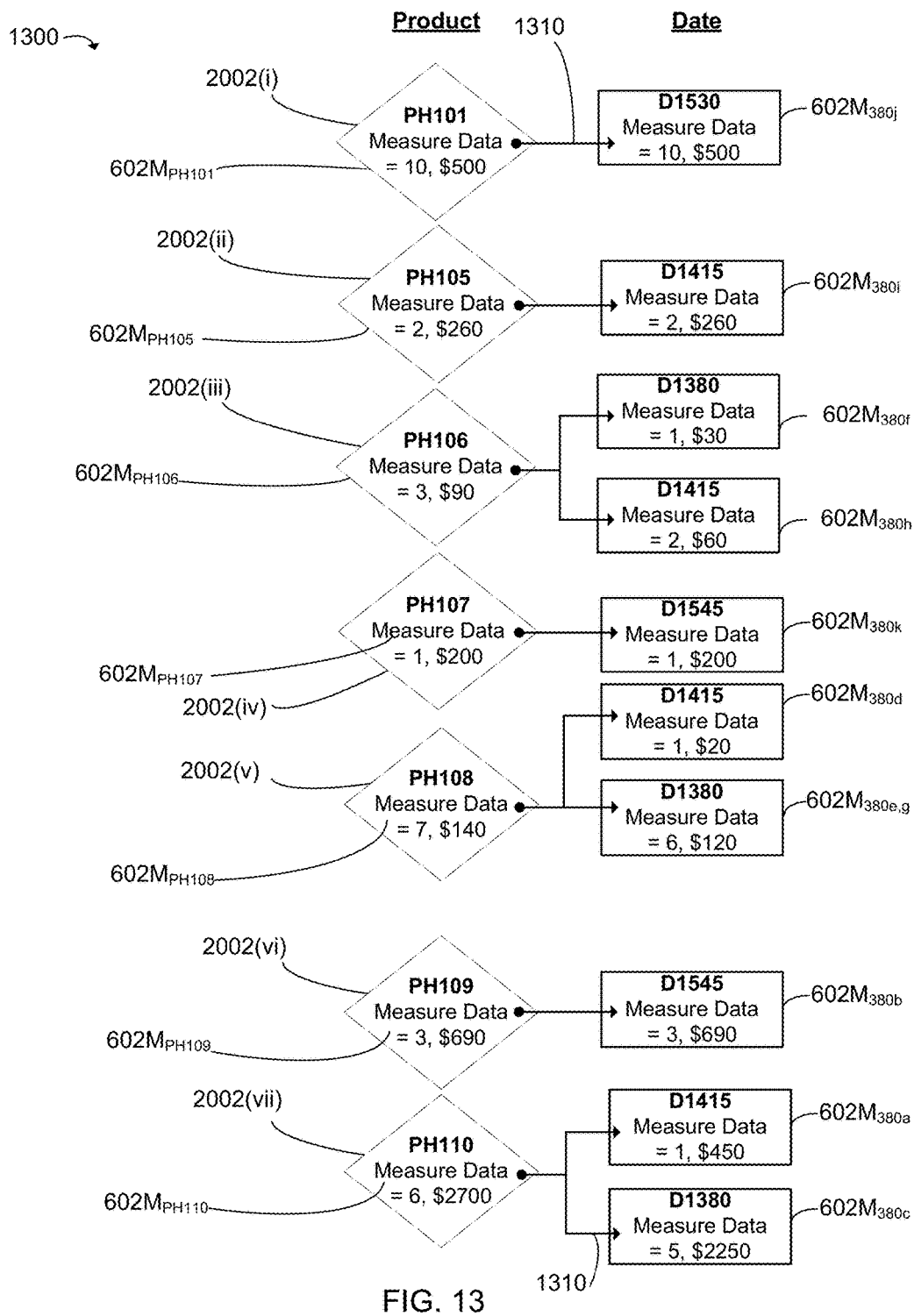
FIG. 13 is a schematic diagram of an example hypergraph tree generated for the sales order entries in the hierarchy sales order table of FIG. 6 based on the second hierarchy dimension of the sales order entries, in accordance with an example embodiment.

FIG. 13 illustrates an example second hypergraph tree 1300 corresponding to the hypergraph diagram 800D. The second hypergraph tree 1300 is generated based on the data in the hierarchy sales order table 600. Generally, the second hypergraph tree 1300 may be generated by the hypergraph generator 118 in a similar manner as generating the first hypergraph tree 1100, but in respect of a fewer number of hierarchy dimensions. In the example of FIG. 13, the hypergraph generator 118 will not include the data in the region hierarchy dimension 364 when generating the second hypergraph tree 1300 since the hypergraph generator 118 assigned the region hierarchy dimension 364 the first dimension rank.

The second hypergraph tree 1300 includes two hierarchy dimensions, namely the product hierarchy dimension 310 and the date hierarchy dimension 362. The initial nodes 2002 of the second hypergraph tree 1300 corresponds to the hierarchy and measure data values associated with the product hierarchy dimension 310.

As shown in FIG. 13, the initial node 2002(*i*) corresponds to the product hierarchy identifier 502B, "PH101". From the hierarchy sales order table 600, the hypergraph generator 118 can determine that the metric records 380' with a data value associated with the product hierarchy identifier 502B, "PH101", includes only metric record 380*j*', and therefore, the initial node 2002(*i*) for the second hypergraph tree 1300 can include an edge weighting that corresponds to the measure data value of the metric record 380'*i* ($602M_{PH101}$).

Still referring to the initial node 2002(*i*), the hypergraph generator 118 can then generate, and link, a first subsequent node 2004(*i*) for the hierarchy dimension assigned the third dimension rank, which, in the example hierarchy sales order table 600 of FIG. 6, is the date hierarchy dimension 362. As shown in FIG. 13, only one first subsequent node 2004(*i*)

links from the initial node 2002(*i*) and the first subsequent node 2004(*i*) may also be associated with a corresponding first measure data values.

The other second initial nodes 2002(*ii*) to 2002(*vii*) are generated for the remaining data values in the hierarchy sales order table 600. As shown in FIG. 13, the hypergraph generator 118 generates the initial node 2002(*ii*) for the product hierarchy identifier 502B, "PH105"; the initial node 2002(*iii*) for the product hierarchy identifier 502B, "PH106"; the initial node 2002(*iv*) for the product hierarchy identifier 502B, "PH107"; the initial node 2002(*v*) for the product hierarchy identifier 502B, "PH108"; the initial node 2002(*vi*) for the product hierarchy identifier 502B, "PH109"; and the initial node 2002(*vii*) for the product hierarchy identifier 502B, "PH110". Similar to the generation of the initial node 2002(*i*), the hypergraph generator 118 can generate, and then link, the first subsequent nodes 2004(*i*) for each of the initial nodes 2002(*ii*) to 2002(*vii*) based on the data values in the hierarchy sales order table 600. Example links 1310 are shown in FIG. 13. It will be understood that, for ease of exposition, only some of the links 1310 shown in FIG. 13 are labeled with the reference numeral.

Figure 14:
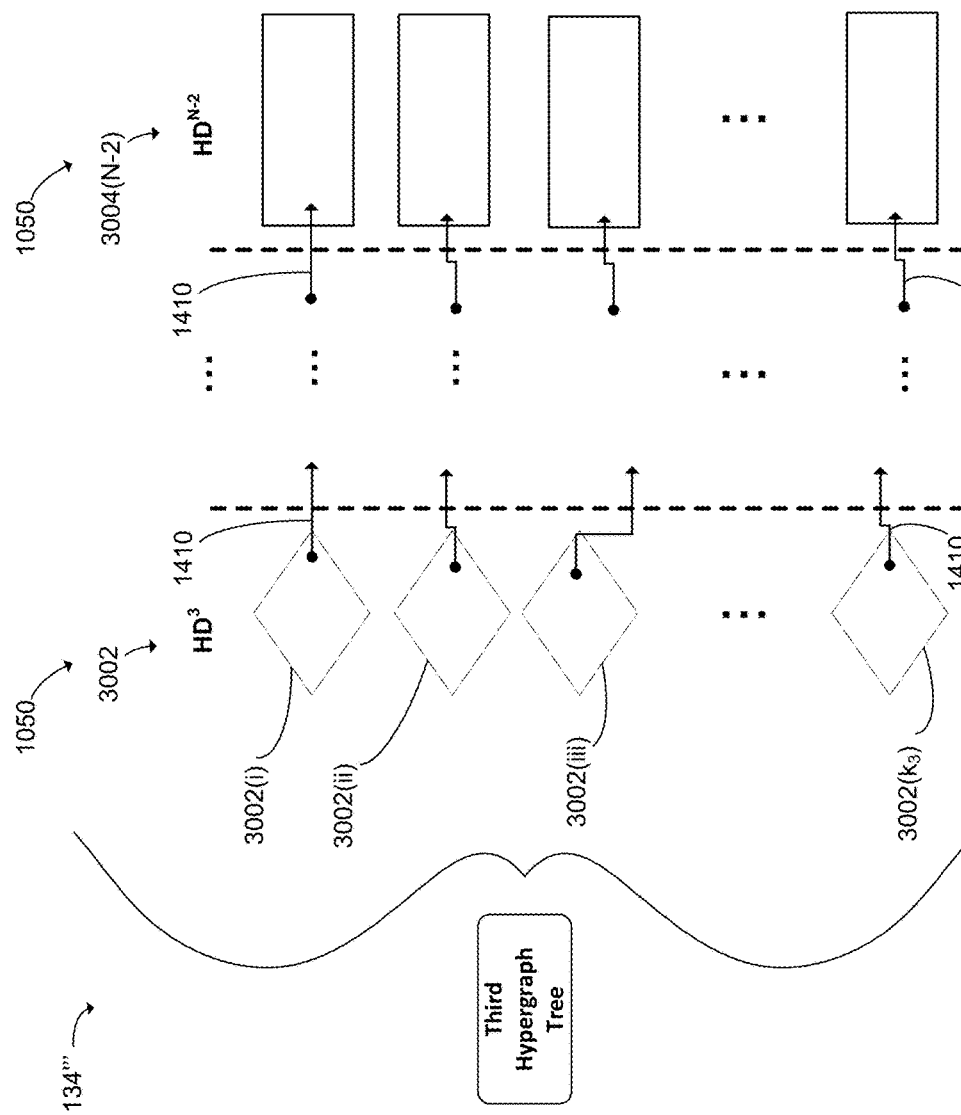
FIG. 14 is a schematic diagram of an example third hypergraph tree generated for the example dataset for which the schematic diagram of FIGS. 10 and 12 were generated, and based on a third hierarchy dimension of the example dataset, in accordance with an example embodiment.

The hypergraph generator 118 may, in some embodiments, generate another additional hypergraph tree based on another hierarchy dimension. That is, the hypergraph generator 118 may generate another additional hypergraph tree for a hierarchy dimension assigned a hierarchy dimension order that is subsequent to the first dimension rank and different from the second dimension rank. Reference will now be made to FIG. 14, which illustrates another example additional hypergraph tree 134'''.

For example, as shown in FIG. 14, the hypergraph generator 118 may generate a third hypergraph tree 134''' for the hierarchy dimension assigned the third dimension rank. The initial nodes 3002 in the hypergraph tree 134''' can correspond to a distinct data value in the third hierarchy dimension ($HD^3$), and the subsequent hierarchy dimensions ($HD^4$ to $HD^{N-2}$) can be represented with subsequent nodes 3004(*i*) to 3004(N-2). Therefore, for metric records with a $k_3$ number of distinct data values in the third hierarchy dimension, a corresponding number of $k_3$ initial nodes 3002(*i*) to 3002($k_3$) will be generated by the hypergraph generator 118. Each tier 1050 of subsequent nodes 3004 that link from the initial nodes 3002 will correspond to the data values in the respective hierarchy dimensions according to the assigned dimension ranks. Example links 1410 are shown in FIG. 14. It will be understood that, for ease of exposition, only some of the links 1410 shown in FIG. 14 are labeled with the reference numeral.

Figure 15:
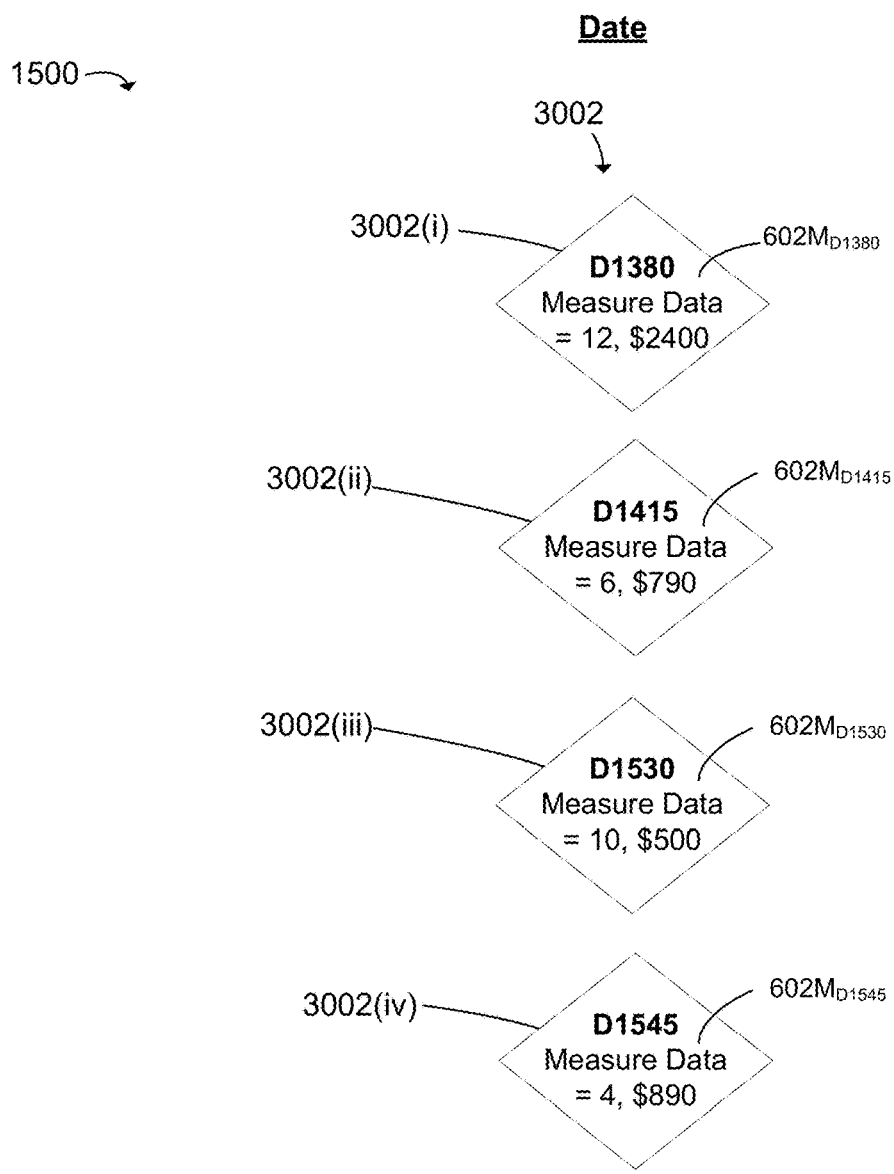
FIG. 15 is a schematic diagram of an example hypergraph tree generated for the sales order entries in the hierarchy sales order table of FIG. 6 based on the third hierarchy dimension of the sales order entries, in accordance with an example embodiment.

FIG. 15 illustrates an example third hypergraph tree 1500 corresponding to the hypergraph diagram of FIG. 9. The third hypergraph tree 1500 may, in some embodiments, be derived from the hypergraph diagram, or, in some embodiments, be generated from the data in the hierarchy sales order table 600. Generally, the third hypergraph tree 1500 may be generated by the hypergraph generator 118 in a similar manner as generating the first and second hypergraph trees 1100 and 1300, but in respect of a fewer number of hierarchy dimensions. In the example of FIG. 15, the hypergraph generator 118 will not include the data in the region hierarchy dimension 364 or the product hierarchy dimension 310 when generating the third hypergraph tree 1500 since the hypergraph generator 118 assigned the region hierarchy dimension 364 the first dimension rank and the product hierarchy dimension 310 the second dimension rank.

The third hypergraph tree 1500 includes one hierarchy dimension, namely the date hierarchy dimension 362. The initial nodes 3002 corresponds to the hierarchy and measure data values associated with the date hierarchy dimension 362.

As shown in FIG. 15, the initial node 3002(*i*) corresponds to the date hierarchy identifier 502A, "D1380". From the hierarchy sales order table 600, the hypergraph generator 118 can determine that the metric records 380' with a data value associated with the date hierarchy identifier 502A, "D1380", includes metric records 380*c*' and 380*e*' to 380*g*', and therefore, the initial node 3002(*i*) can include an edge weighting that corresponds to a sum of the measure data values of the metric records 380*c*' and 380*e*' to 380*g*' ($602M_{D1380}$). Since the region hierarchy dimension 364 is associated with the last dimension rank, the initial node 3002(*i*) is not linked to any subsequent nodes 3004.

The other initial nodes 3002(*ii*) to 3002(*v*) are generated for the remaining data values in the hierarchy sales order table 600. As shown in FIG. 15, the hypergraph generator 118 generates the initial node 3002(*ii*) for the region hierarchy identifier 502A, "D1415"; the initial node 3002(*iii*) for the region hierarchy identifier 502A, "D1530"; and the initial node 3002(*iv*) for the region hierarchy identifier 502A, "D1545".

For the example hypergraph trees 1100, 1300, and 1500 shown and described herein, a hypergraph tree 134 is generated for all the hierarchy dimensions associated with the data in the hierarchy sales order table 600, namely the date hierarchy dimension 362, the product hierarchy dimension 310 and the region hierarchy dimension 364. In some embodiments, only two or more hypergraph trees 134 may be generated. For example, in some embodiments, the first hypergraph tree 1100 and the second hypergraph tree 1300 may be generated, and in some other embodiments, the first hypergraph tree 1100 and the third hypergraph tree 1500 may be generated.

Figure 16:
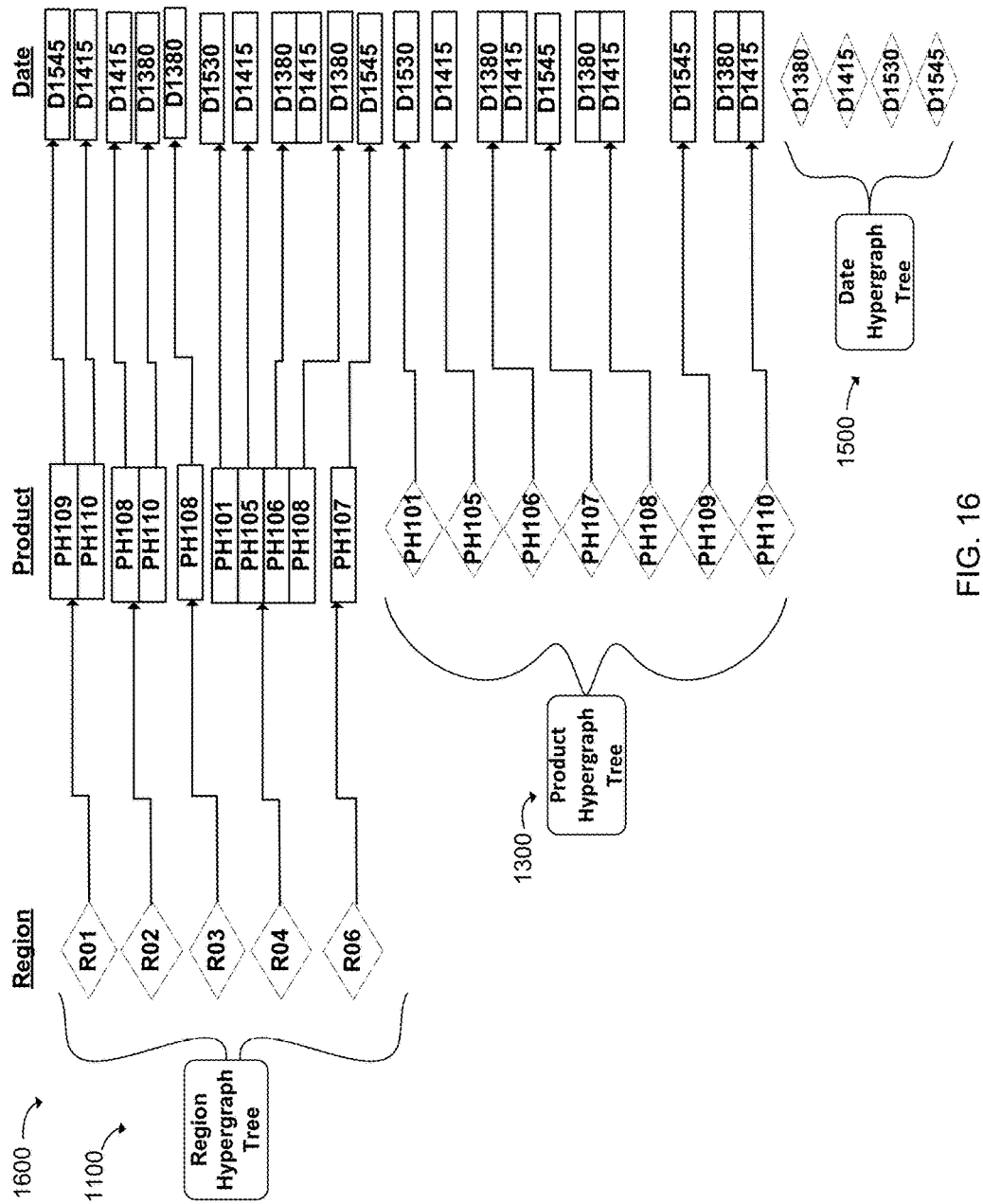
FIG. 16 is a schematic diagram of the example hypergraph trees of FIGS. 11, 13 and 15, in accordance with an example embodiment.

For the reader's convenience, a simplified version of the schematic diagrams of the example set 1600 of a plurality of hypergraph trees 1100, 1300, and 1500 of FIGS. 11, 13, and 15, respectively, are shown in FIG. 16. As described, the set 1600 of hypergraph trees is an example. The set 1600 of hypergraph trees may not include all three hypergraph trees 1100, 1300, and 1500 and may instead include one or two of the three hypergraph trees 1100, 1300, and 1500.

As can be seen, the data in the hierarchy sales order table 600 can be provided in the example hypergraph trees 1100, 1300, and 1500. As described, these example hypergraph trees 1100, 1300, and 1500 can improve the performance of the queries by the analytical engine 110 since the relevant hypergraph tree(s) 134 can be identified based on the received query and the relevant data retrieved.

Figure 17A:
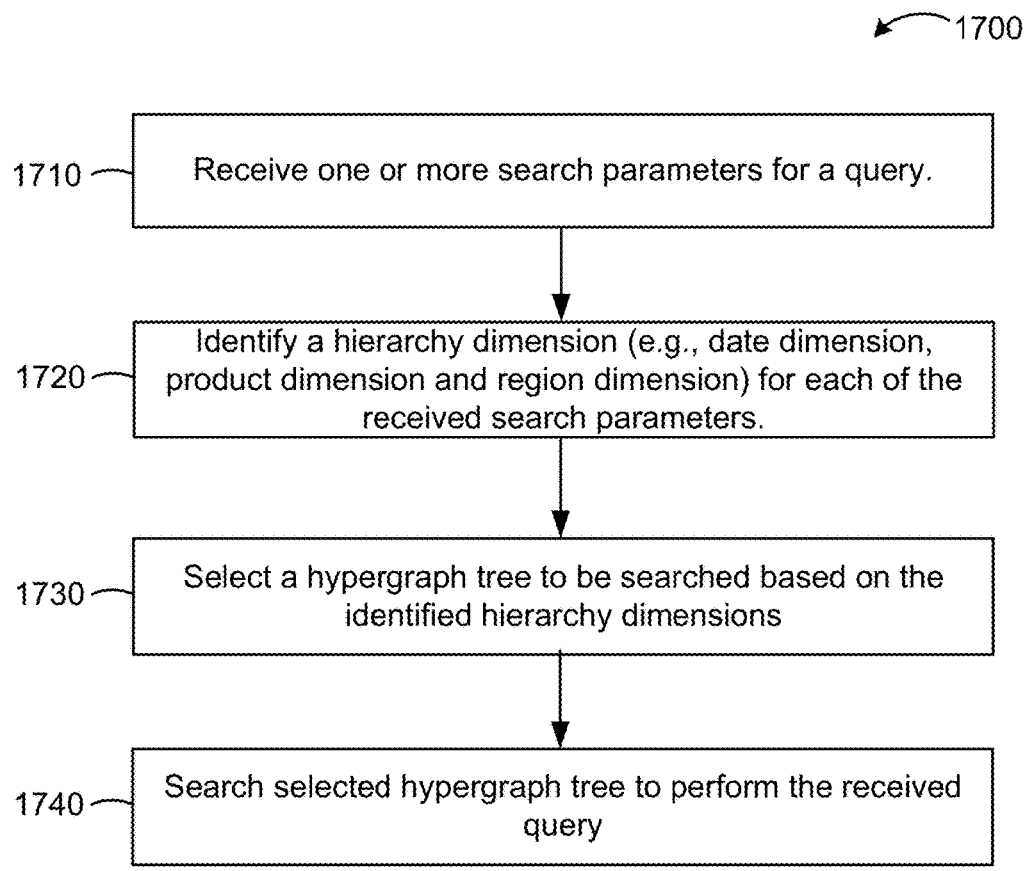
FIG. 17A is a flowchart of an example embodiment of various methods of searching hypergraph trees.

An example method of searching various hypergraph trees 134 will now be described with reference to FIG. 17A, which is a flowchart 1700.

At 1710, the processor 112 can receive one or more search parameters for a query.

The processor 112 may receive the query via the interface component 116. In an example, the processor 112 may receive the query via the dashboard interface 202 shown in FIG. 2.

Referring again to FIG. 2, the example dashboard interface 202 includes a report portion 220 and a query submission portion 210. In the example shown in FIG. 2, the query submission portion 210 includes various dropdown controls for receiving parameters of the query from the user. Generally shown at 212 are dropdown controls 212*s* and 212*e* for receiving the respective start date and end date parameters for the query. Dropdown controls 214c and 214p are shown generally at 214 for receiving the respective product category and product identification parameters for the query. A dropdown control 216r is shown generally at 216 for receiving the region parameter for the query. A submission control 218 is also provided in the query submission portion 210. The report portion 220 includes a graph 222 generated by the analytical engine 110 for the query received based on the selections in the query submission portion 210.

It will be understood that the dashboard interface 202 is not limited to the illustrated portions 210 and 220, and may include other portions for manipulating and displaying the relevant data. It will be further understood that the graph 222 in the report portion 220 is merely an example and that other schematics may be provided instead or in addition to the graph 222. Similarly, the dropdown controls shown in the query submission portion 210 are also for illustration purposes and are not intended to limit the configuration of the query submission portion 210 in any way.

The query received via the dashboard interface 202 can include search parameters associated with the date hierarchy dimension 362 (e.g., start date and end date parameters from the respective dropdown controls 212s and 212e), the product hierarchy dimension 310 (e.g., product category and product identification parameters from the respective dropdown controls 214c and 214p), and the region hierarchy dimension 364 (e.g., region parameter from the dropdown control 216r). It will be understood that the search parameters described with reference to FIG. 2 are merely examples and that other search parameters may similarly be provided in the query.

For example, as illustrated in FIG. 2, an example query can include the search parameters: a date range from Jan. 1, 2014 to Jun. 30, 2014, for all products sold by the business operating the dashboard interface 202, and for the region, Ontario, Canada.

In some embodiments, the processor 112 may receive the search parameters in a metric set configuration. The metric set configuration may identify the hierarchy dimensions and measure data being requested based on the search parameters.

At 1720, the processor 112 can identify a hierarchy dimension for each of the received search parameters.

Upon receipt of the query, the processor 112 can determine the hierarchy dimensions for each of the search parameters. Each of the search parameters may be associated with a data type. Referring still to the example query received from the dashboard interface of FIG. 2, the start and end date parameters may be associated with the data type "date", the product category and product identification parameters may be associated with the data type "product" and the region parameter may be associated with the data type "region". Based on the data types, the processor 112 can identify the corresponding hierarchy dimensions for each of the search parameters.

At 1730, the processor 112 can select a type of hypergraph tree 134 to be searched based on the identified hierarchy dimensions.

Figure 17B:
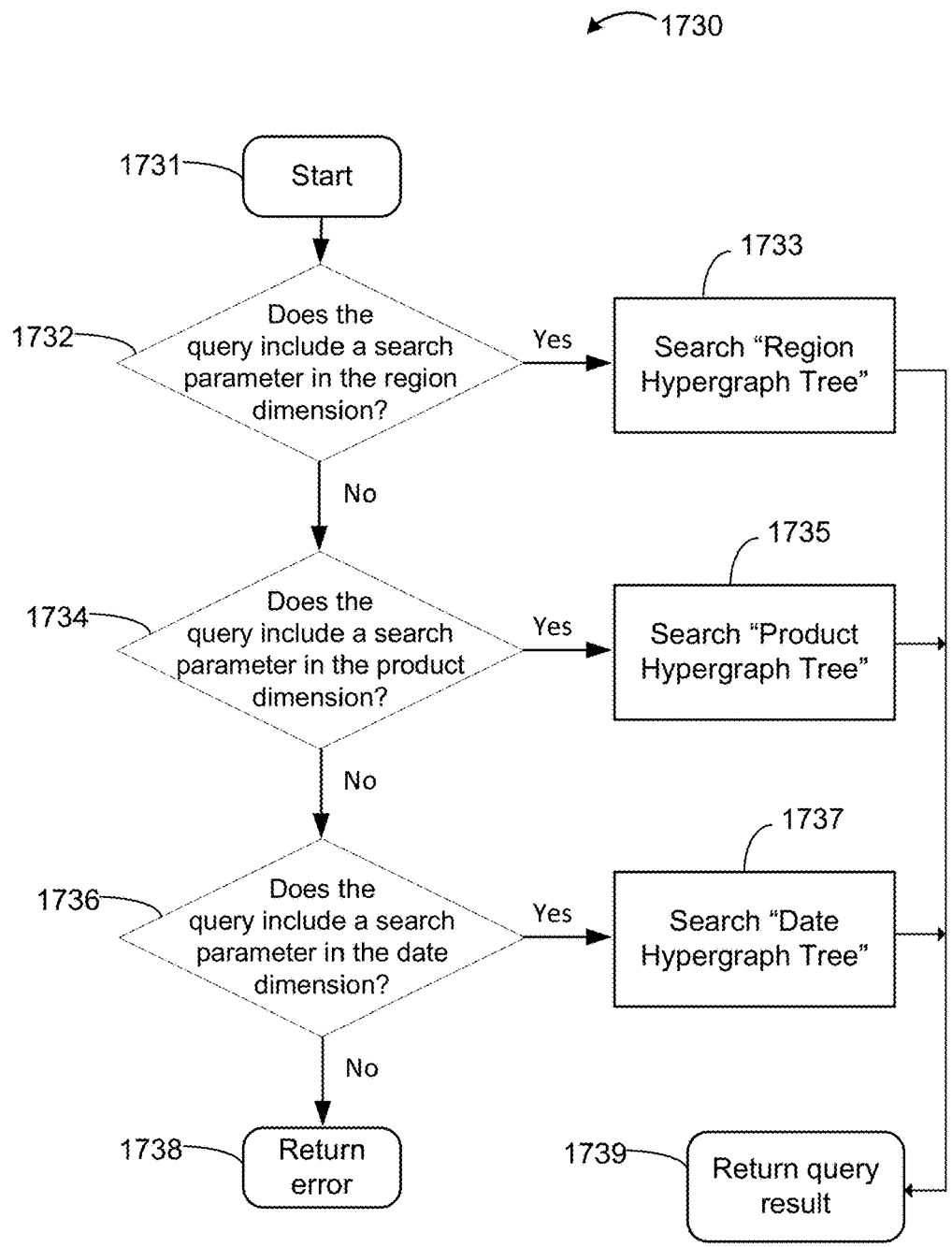
FIG. 17B is a flowchart of an example method of selecting a type of hypergraph tree to be searched.

FIG. 17B is a flowchart 1730 of an example method of selecting a type of hypergraph tree 134 to be searched for the hierarchy sales order table 600.

At 1732, the processor 112 determines whether the query includes a search parameter that is associated with a hierarchy dimension assigned the first dimension rank, which, in the described example, is the region hierarchy dimension 364. If the processor 112 determines that the query includes a search parameter in the date hierarchy dimension 362, the processor 112 can determine, at 1733, that a hypergraph tree containing date hierarchy data values is to be searched, such as the first hypergraph tree 1100 of FIG. 11, and can search the tree and return a result at 1739. If not, the processor 112 can proceed to 1734 to determine whether the query includes a search parameter in subsequent dimension ranks. For example, the processor 112 can determine whether the query includes a search parameter that is associated with a hierarchy dimension assigned in the second dimension rank, which, in the described example, is the product hierarchy dimension 310. If the processor 112 determines that the query includes a search parameter in the product hierarchy dimension 310, the processor 112 can determine, at 1735, that a hypergraph tree containing product hierarchy data values but not date hierarchy data values is to be searched, such as the second hypergraph tree 1300 of FIG. 13, and can search the tree and return a result at 1739.

However, if not, the processor 112 can proceed to 1736 to determine whether the query includes a search parameter that is associated with a hierarchy dimension assigned in another subsequent dimension rank, if applicable. In the described example, the processor 112 can determine whether the query includes a search parameter in the date hierarchy dimension 362. If the processor 112 determines that the query includes a search parameter in the region hierarchy dimension 364, the processor 112 can determine, at 1737, that a hypergraph tree containing region hierarchy data values but not product and date hierarchy data values is to be searched, such as the third hypergraph tree 1500 of FIG. 15 is to be searched, and can search the tree and return a result at 1739.

The processor 112 can continue to determine whether the query includes a search parameter that is associated with a hierarchy dimension assigned to any of the subsequent dimensions, and to search the corresponding hypergraph tree if the search parameter is in one of the hierarchy dimension. However, when the processor 112 determines that the query does not include any search parameter associated with any of the relevant hierarchy dimensions, the processor 112 can determine that none of the hypergraph trees 134 in the hypergraph storage component 130 are applicable and can end the query at 1738 (e.g. by returning an empty set, and/or by displaying an error message).

Referring again to FIG. 17A, at 1740, the processor 112 can search the selected hypergraph tree 134 to perform the received query.

For example, with respect to the query received from the dashboard interface of FIG. 2, the processor 112 can determine that the date hypergraph tree 1110 (or the first hypergraph tree for the data in the hierarchy sales order table 600) is to be searched since the query includes region hierarchy dimension 364, which was assigned the first dimension rank in the illustrated example.

Figure 17C:
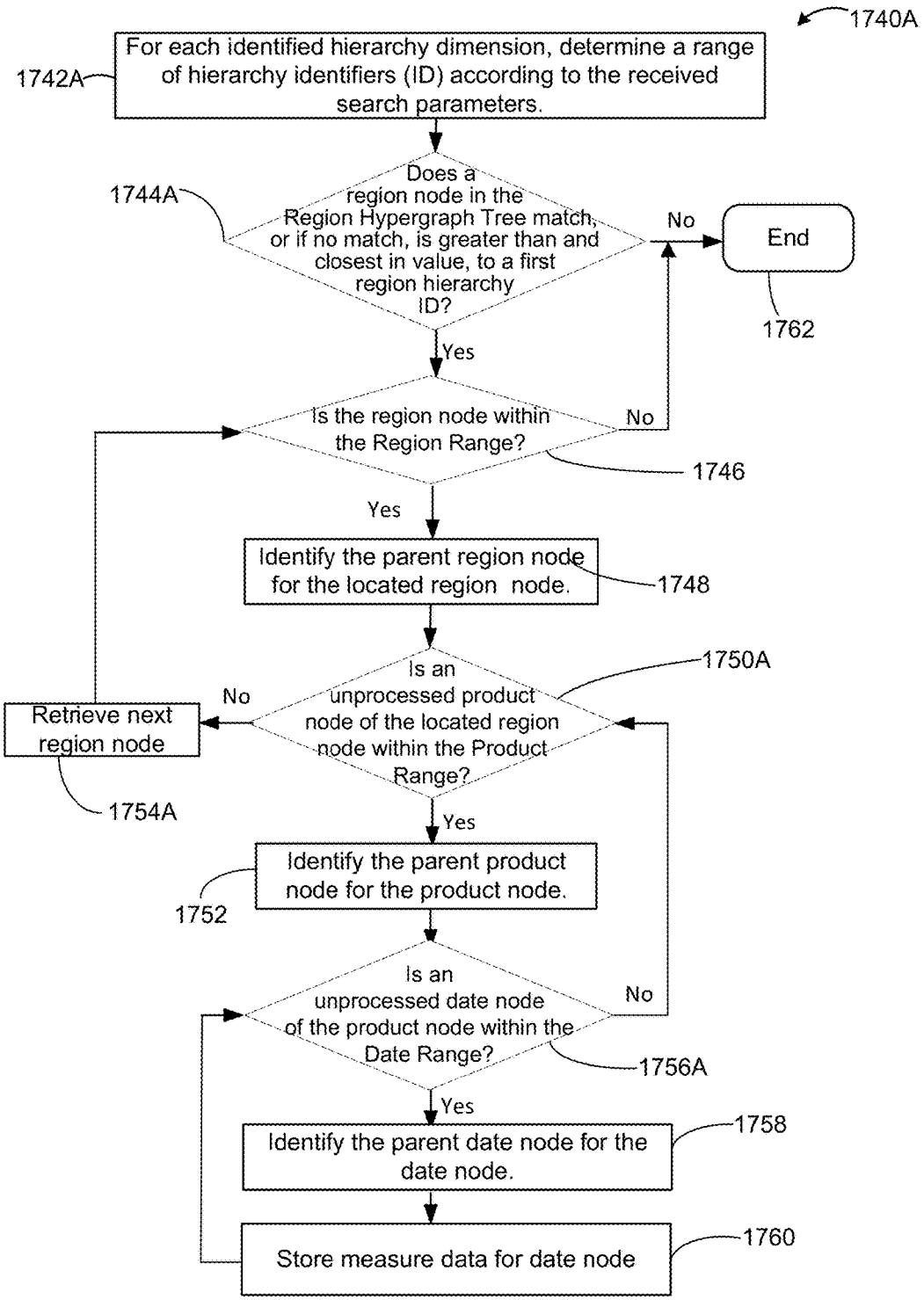
FIGS. 17C to 17E are flowcharts of example methods of searching various types of hypergraph trees.
Figure 17D:
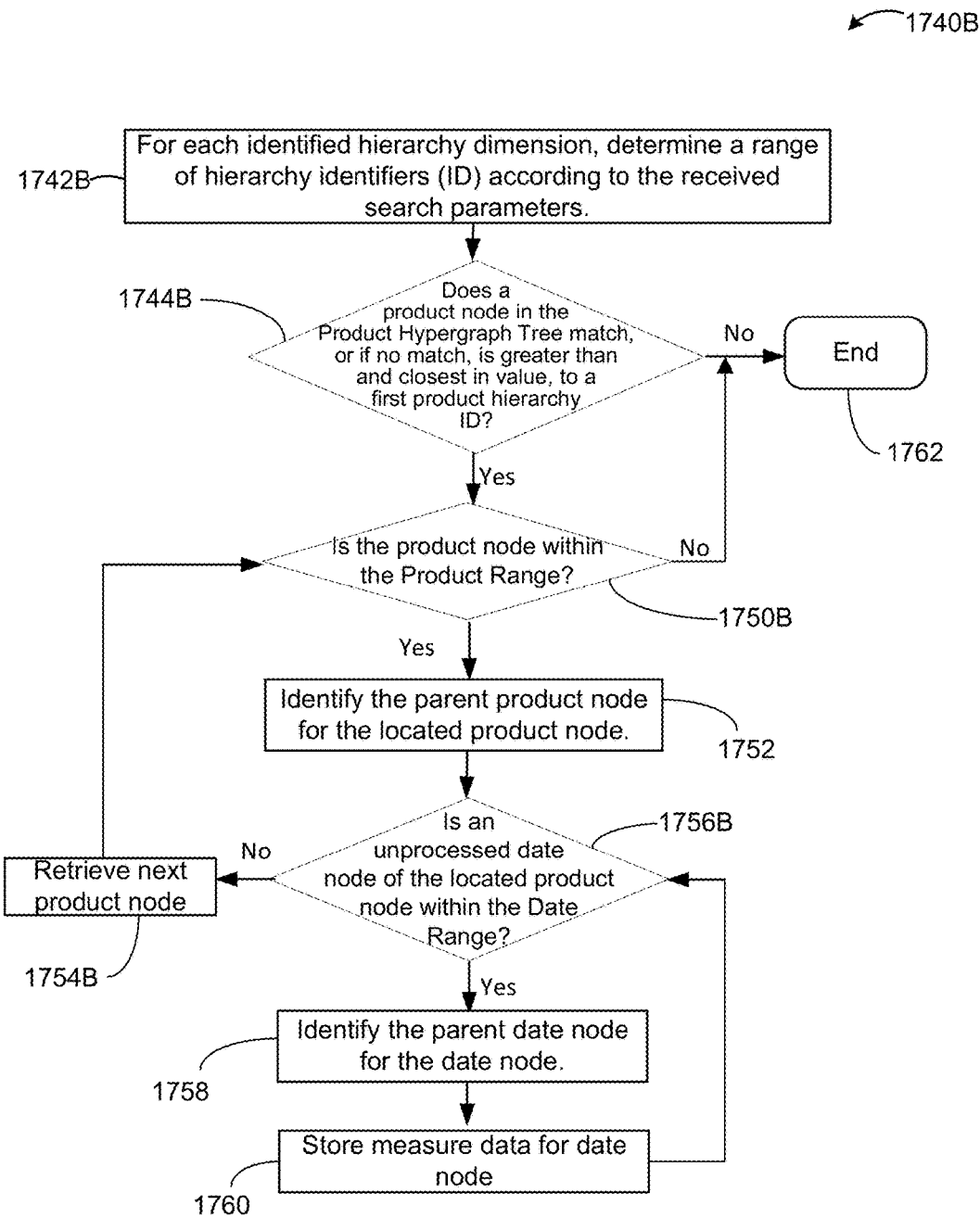
Figure 17E:
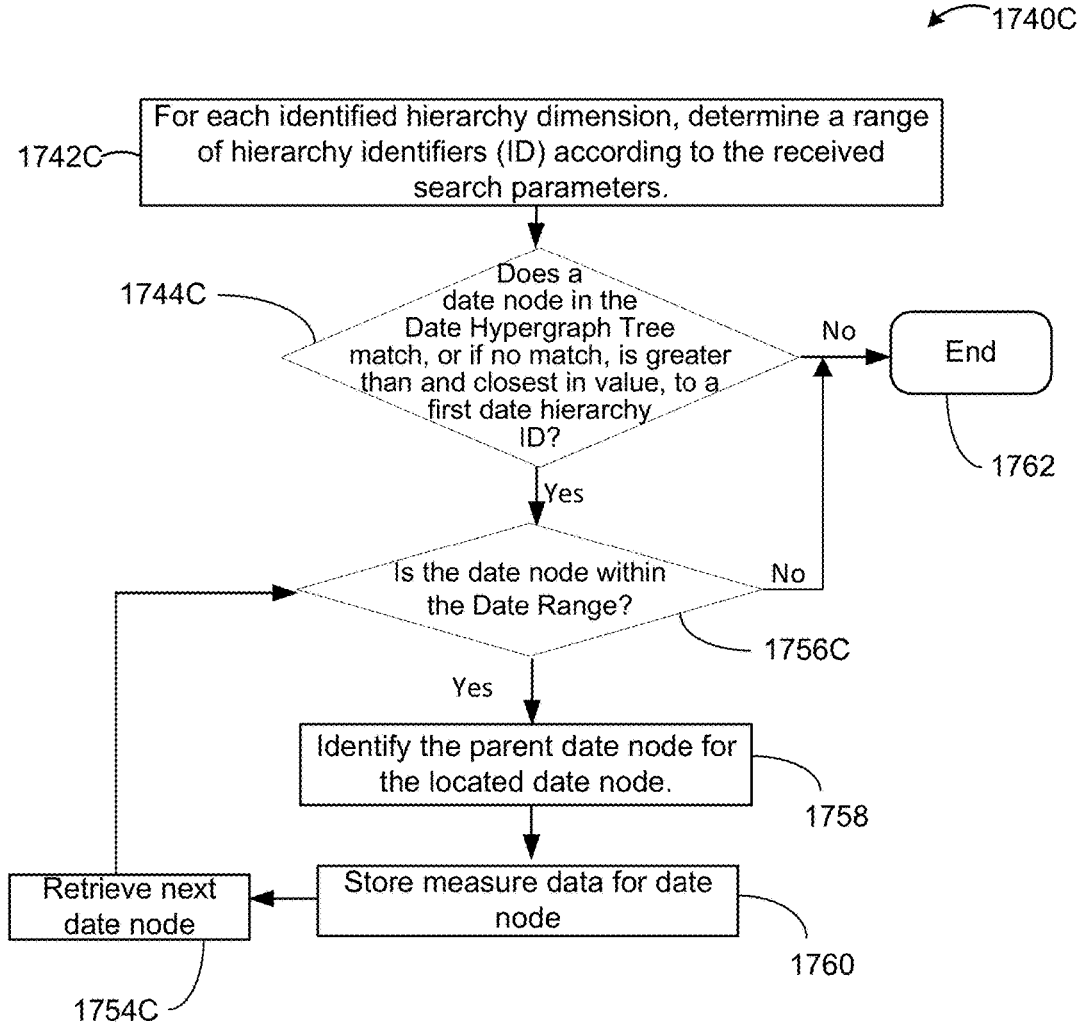

FIGS. 17C to 17E are flowcharts 1740A to 1740C, respectively, of example methods of searching various types of hypergraph trees 134. The various flowcharts 1740A to 1740C are directed to searching hypergraph trees 134 with a different number of hierarchy dimensions. As will be described, the flowchart 1740A is directed to searching hypergraph trees with three hierarchy dimensions, such as the first hypergraph tree 1100 of FIG. 11; the flowchart 1740B is directed to searching hypergraph trees with two hierarchy dimensions, such as the second hypergraph tree 1300 of FIG. 13; and the flowchart 1740C is directed to searching hypergraph trees with one hierarchy dimension, such as the third hypergraph tree 1500 of FIG. 15.

Referring now to FIG. 17C, the processor 112 can determine, at 1742A, a range of hierarchy identifiers for each of the received search parameters. Recall that the example query includes the search parameters: a date range from Jan. 1, 2014 to Jun. 30, 2014, for all products sold by the business operating the dashboard interface 202, and for the region, Ontario, Canada.

Generally, when the relevant hypergraph tree 134 has been identified, the processor 112 can determine the range of initial nodes 1002 that satisfy the scope of the search parameters. The region in the query is Ontario, Canada, and so, the relevant initial nodes 1002 will be associated with the region hierarchy identifier 502C "R04"", as determined from the region hierarchy table 500C of FIG. 5C.

The processor 112 can then determine the range of the hierarchy identifiers for the other search parameters in the received query. The example query includes search parameters associated with the product hierarchy dimension 310 and the date hierarchy dimension 362. From the search parameters, the range of the product hierarchy dimension 310 includes all products and therefore, the relevant first subsequent nodes 1004(i) will be associated with the range of product hierarchy identifier 502B from "PH101" to "PH110", as determined from the product hierarchy table 500B of FIG. 5B. The range of the date hierarchy dimension 362 in the example query is from Jan. 1, 2014 to Jun. 30, 2014, and so, the relevant nodes will be associated with the range of date hierarchy identifier 502A from "D1366" to "D1545", as determined from the product hierarchy table 500A of FIG. 5A.

At 1744A, the processor 112 can determine whether an initial node 1002 in the first hypergraph tree 1100 matches, or if no match, is greater than and closest in value, to a first region hierarchy identifier (e.g., "R04" for the example query). If the processor 112 cannot identify an initial node 1002 that fulfills the requirements at 1744A, the processor 112 can proceed to 1762 and may indicate that no data values are available for the query.

At 1746, in response to identifying an initial node 1002 that fulfills at least one of the requirements at 1744A, the processor 112 can then determine whether that identified initial node 1002 is with the region range determined at 1742A. If the processor 112 determines that the identified initial node 1002 is outside the region range, the processor 112 proceeds to 1762. However, if the processor 112 determines the identified initial node 1002 is within the region range, the processor 112 can then identify, at 1746, the parent region node corresponding to the initial node 1002. In this example, the parent region node corresponds to the country level 530 of the region hierarchy table 500C since the initial node 1002 corresponds to the region level 532.

At 1750A, the processor 112 can determine whether any unprocessed first subsequent nodes 1004(i), such as the product nodes, linked from the identified initial node 1002 is within the range of the product hierarchy identifiers ("product range") determined at 1742A. For the example query, all subsequent nodes 1004(i) linked to the initial node 1002(ii) satisfy the product range since all products (e.g., "PH101" to "PH110") have been identified as relevant.

The processor 112 can proceed to retrieve the next region node, at 1754A, if the processor 112 determines the identified initial node 1002 is not associated with an unprocessed product node. For the example query, the processor 112 will only retrieve data associated with the initial node 1002(iv) since the initial node 1002(iv) is associated with a region hierarchy identifier (e.g., "R04", respectively) within the query.

However, if the processor 112 identifies an unprocessed product node, the processor 112 can then identify, at 1752, the parent product node corresponding to the identified product node 1004(i). The reason the parent node is located is that, for example, if a query requests data from the product category level or year level, the result must contain hierarchy members from the requested level, and measure values have to be aggregated for each of the members. Since the hypergraph structure stores the lowest level data, the query processor should adjust and aggregate extracted values according to the request. In general, data retrieval from the hypergraph structure can be considered as extraction of a subhypergraph and further aggregation to specific levels if necessary. Continuing with reference to the example query, the relevant parent product nodes for the identified unprocessed first subsequent nodes 1004(i) linked to the initial node 1002(ii) include "Swimwear" for PH101, "Footwear" for "PH105", "Instructional Kit" for "PH106", and "Sport Equipment" for "PH108".

At 1756A, the processor 112 can determine whether any unprocessed second subsequent nodes 1004(ii), such as the date nodes, linked from the identified product node 1004(i) is within the range of the date hierarchy identifiers ("date range") determined at 1742A. As described above the range of the date hierarchy dimension 362 in the example query is from Jan. 1, 2014 to Jun. 30, 2014, and so, the relevant nodes will be associated with the range of date hierarchy identifier 502A from "D1366" to "D1545". As shown from FIG. 11, each of the first subsequent nodes 1004(i) linked to the initial node 1002(ii) associated with the product hierarchy identifier 502B, "PH105" and "PH106", is linked with a second subsequent node 1004(ii) that satisfy the region range.

If no unprocessed second subsequent nodes 1004(ii) are available, the processor 112 can proceed to 1750A to determine whether any other unprocessed product nodes 1004(i) are available. However, if the processor 112 identifies an unprocessed date node, the processor 112 can then identify, at 1758, the parent date node corresponding to the identified date node 1004(ii). For the example query, using the example hypergraph tree 1100 of FIG. 11, the processor 112 can determine that the initial node 1002(ii) (associated with the date hierarchy identifier "D1380") is greater than the first date hierarchy identifier ("D1366").

If the processor 112 determines that the identified initial node 1002(ii) is outside the date range, the processor 112 proceeds to 1750A.

However, if the processor 112 determines the identified initial node 1002(ii) is within the date range, the processor 112 can then identify the parent date node corresponding to the initial node 1002. The parent date node corresponds to a data member in the hierarchy dimension/data table 500 preceding the hierarchy identifier 502 associated with the identified initial node 1002. In this example, the parent date node corresponds to the month level 512 of the date hierarchy dimension/table 500A since the initial node 1002 corresponds to the day level 514. For the example query, the parent data node of the initial node 1002(ii) identified at 1756A will correspond to "January 2014", as determined from the date hierarchy dimension/table 500A of FIG. 5A.

At 1760, the processor 112 can store the measure data for the identified date node 1004(ii). Processor 112 preferably aggregates the value since it enumerates edges in hypergraph and there could be more than one unique edge that after the parent's identification will produce the non-unique member combination. Also, the measure data is preferably stored for the parent-member combination, not just for the date's parent node.

As shown in FIG. 11, for the example search query, the measure data, $602M_{380f}$ to $602M_{380j}$, are associated with the hierarchy data values that satisfy the search parameters.

The data values associated with the nodes 1002, 1004 of the hypergraph trees described herein, such as 134', 1100, 134'', 1300, 134''', 1500, may, in some embodiments, be compressed or stored in the cache memory of the hypergraph storage component 130 in order to minimize use of storage capacity. When the processor 112 determines the measure data values 602M are not available at the identified region node 1004(ii), the processor 112 may then determine whether any corresponding measure data values 602M are available in the cache memory of the hypergraph storage component 130.

The processor 112 may store the measure data in a cellset. The cellset can be a data structure that includes the relevant hierarchies, hierarchy members and cells which are associated with the respective measure data values 602M. For the identified date node 1004(ii), the processor 112 can determine whether an entry in the cellset corresponds to the hierarchy identifiers associated with the identified date node 1004(ii). If the processor 112 identifies an entry that corresponds to those hierarchy identifiers, the processor 112 can aggregate the measure data values with those already in that entry. However, if not, the processor 112 can store the measure data values as a new entry in the cellset.

Following storing the measure data for the identified date node 1004(ii) at 1760, the processor 112 can return to 1756A to determine whether any other unprocessed date nodes 1004(ii) are available, and to then proceed accordingly.

An example method of searching hypergraph trees 134 with two hierarchy dimensions, such as the second hypergraph tree 1300 of FIG. 13, will now be described with reference to the flowchart 1740B of FIG. 17D.

Similar to the method shown in FIG. 17C, the processor 112 can determine, at 1742B, a range of hierarchy identifiers for each of the received search parameters. For the second hypergraph tree 1300, the applicable ranges are the product range and the date range. For example, the second hypergraph tree 1300 may be searched in response to receiving a query including the search parameters: a date range from Jan. 1, 2014 to Jun. 30, 2014, for all products sold by the business operating the dashboard interface 202.

At 1744B, the processor 112 can determine whether an initial node 1002 in the second hypergraph tree 1300 matches, or if no match, is greater than and closest in value, to a first product hierarchy identifier. If the processor 112 cannot identify an initial node 1002 that fulfills the requirements at 1744B, the processor 112 can proceed to 1762 and may indicate that no data values are available for the query.

At 1750B, in response to identifying an initial node 1002 that fulfills at least one of the requirements at 1744B, the processor 112 can then determine whether that identified initial node 1002 is with the range of the product range determined at 1742B. If the processor 112 determines that the identified initial node 1002 is outside the product range, the processor 112 proceeds to 1762. However, if the processor 112 determines the identified initial node 1002 is within the product range, the processor 112 can then identify, at 1752, the parent product node corresponding to the initial node 1002. In this example, the parent product node corresponds to the product subcategory level 316 of the product hierarchy dimension/table 500B since the initial node 1002 corresponds to the product level 310.

At 1756B, the processor 112 can determine whether any unprocessed first subsequent nodes 1004(i), such as the date nodes in this example, linked from the identified product node 1002 is within the date range determined at 1742B. If no unprocessed first subsequent nodes 1004(i) are available, the processor 112 can proceed to 1754B to retrieve the next available product node 1002. However, if the processor 112 identifies an unprocessed date node, the processor 112 can then identify, at 1758, the parent date node corresponding to the identified date node 1004(i).

As described with reference to 1760 of FIG. 17C, the processor 112 can store, at 1760, the measure data for the identified date node 1004(i), and proceed to 1756B accordingly.

Referring now to FIG. 17E, which illustrates a method of searching hypergraph trees 134 with one hierarchy dimension, such as the third hypergraph tree 1500 of FIG. 15, in the flowchart 1740C.

Similar to the methods shown in FIGS. 17C and 17D, the processor 112 can determine, at 1742C, a range of hierarchy identifiers for each of the received search parameters. For the third hypergraph tree 1500, the applicable range is the region range. For example, the second hypergraph tree 1300 may be searched in response to receiving a query including the search parameters: a date range from Jan. 1, 2014 to Jan. 31, 2014.

At 1744C, the processor 112 can determine whether an initial node 1002 in the third hypergraph tree 1500 matches, or if no match, is greater than and closest in value, to a first date hierarchy identifier. If the processor 112 cannot identify an initial node 1002 that fulfills the requirements at 1744C, the processor 112 can proceed to 1762 and may indicate that no data values are available for the query.

At 1756C, in response to identifying an initial node 1002 that fulfills at least one of the requirements at 1744C, the processor 112 can determine whether the identified initial node 1002 is within the date range determined at 1742C. If the processor 112 determines that the identified initial node 1002 is outside the date range, the processor 112 proceeds to 1762. However, if the processor 112 determines the identified initial node 1002 is within the date range, the processor 112 can then identify, at 1758, the parent date node corresponding to the initial node 1002. In this example, the parent date node corresponds to the month level 514 of the date hierarchy table 500A since the initial node 1002 corresponds to the date level 534.

At 1760, like in FIGS. 17C and 17D, the processor 112 can store the measure data for the identified date node 1002, and proceed to 1754C to retrieve the next available date node 1002 accordingly.

The interface component 116 may, in some embodiments, also operate to provide hypergraph user interfaces (not shown) associated with the building of the hypergraph structures 134. For example, the processor 112 may receive, via a hypergraph user interface, control inputs from the users to initiate the building of the hypergraph structures 134, to facilitate modifications to the hypergraph structures, and/or to facilitate access to the hypergraph structures 134. The hypergraph user interface may also display a list of available hypergraph structures and the data (e.g., hierarchy dimensions, etc.) available in each of the hypergraph structures 134.

Generally, the memory component 114 may operate to store data associated with the queries to be performed by the processor 112. For example, the query parameters received via the dashboard interface 202 may be stored in the memory component 114. Data associated with the various interfaces that may be provided by the interface component 116 may also be stored in the memory component 114. The memory component 114 may also store data related to which users can access the analytical engine 110 for submitting queries for certain data (e.g. the memory component 114 may contain access lists for the hypergraph tree data, for example a regional manager may only be permitted access to sales data for her region). For example, the memory component 114 may store personal information related to the users and/or user preferences. The user preferences may indicate how the user may prefer data to be displayed via the dashboard interface 202 (e.g., bar graph vs. line graph, etc.). It will be understood that other data associated with the queries may also be stored in the memory component 114. In some embodiments, prior to generating the hypergraph trees 134 for the data in the hierarchy sales order table 600, the hypergraph generator 118 may group at least some of the metric records 380' in the hierarchy sales order table 600 into one or more record groups. The hypergraph generator 118 may then compress each of those record groups in order to minimize memory usage (e.g., to avoid cache overuse, etc.) at the memory component 114.

The number of metric records 380' in each metric group may be predefined by the analytical engine 110 or the user. For example, a default number of metric records 380' may be set by the analytical engine 110 as 100,000. It will be understood that other number of metric records may be defined for the various metric groups.

With the various metric groups, the hypergraph generator 118 can load each compressed metric group into the memory component 114 and decompress at least one metric group at a time for generating the hypergraph trees 134. The metric groups that have processed by the hypergraph generator 118 can then be discarded.

In some embodiments, the hypergraph generator 118 may decompress multiple metric groups in parallel and generate respective portions of the hypergraph trees 134 for the multiple metric groups in parallel. The number of metric groups that may be processed in parallel by the hypergraph generator 118 can depend on the capabilities of the processor 112. In some embodiments, processor 112 may comprise a cluster (e.g. a group of several servers) in order to process large amounts of data.

Prior to generating the hypergraph trees 134, the hypergraph generator 118 may sample the metric records 380' in the hierarchy sales order table 600 to estimate configuration parameters for the hypergraph trees 134. The hypergraph generator 118 may select a predefined sample number of metric records 380' from the hierarchy sales order table 600 for generating the estimated configuration parameters. The estimated configuration parameters may be determined based on the number of distinct members in each of the hierarchy dimensions in the sample metric records 380'. The configuration parameters can include an estimated node size, for example. The hypergraph generator 118 may determine the estimated node size by extrapolating from the determined number of distinct members.

For example, reservoir sampling may be used to define the number of distinct members used in samples for each hierarchy and sort the hierarchies in ascending order by this number. Next, a hierarchy index in the sorted array may be used to determine a hierarchy position in one or more hypergraph trees.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

I claim:

1. A method of optimizing a computer for performing queries of a database, the database storing a plurality of metric records in a computer memory, each metric record comprising at least one measure data value and a plurality of hierarchy data values, wherein each hierarchy data value is in a hierarchy dimension, wherein each hierarchy dimension comprises at least one hierarchy level, said at least one hierarchy level including a lowest hierarchy level, wherein each hierarchy level comprises at least one distinct hierarchy member; and wherein each hierarchy data value matches a hierarchy member in the lowest level of the corresponding hierarchy dimension, the method comprising:
   a) determining the number of distinct members of the lowest hierarchy level of each hierarchy dimension and determining a unique hierarchy identifier (ID) for such distinct member;
   b) determining the hierarchy dimension having the fewest number of distinct members in its lowest level;
   c) ranking the hierarchy dimensions by number of distinct members in the respective lowest level;
   d) generating a first hypergraph tree for the hierarchy dimension having the fewest number of distinct members in its lowest level, wherein the first hypergraph tree comprises a tier for each hierarchy dimension;
   e) generating one or more additional hypergraph trees, each additional hypergraph tree for a hierarchy dimension having more than the fewest number of distinct members in its lowest level, wherein each additional hypergraph tree comprises at least one tier for a hierarchy dimension and each additional hypergraph tree has fewer than the number of tiers in the first hypergraph tree;
   wherein each hypergraph tree comprises a plurality of nodes, and wherein each node corresponds to one of the unique hierarchy IDs, and wherein each node comprises at least one edge weighting comprising a determined measure data value,
   wherein all of the nodes in a tier correspond to the same hierarchy dimension, and
   wherein each generated hyperqraph tree uniquely corresponds to a different hierarchy dimension;
   f) receiving, via a dashboard interface displayed on a networked computing device, a query comprising one or more search parameters;
   g) identifying a hierarchy dimension for each of the one or more search parameters;
   h) selecting, based on the one or more identified hierarchy dimensions, one of the first hyperqraph tree and the one or more additional hypergraph trees;
   i) searching the selected hyperqraph tree to perform the query; and
   j) returning a result of the query to the networked computing device for presentation in the dashboard interface.

2. The method of claim 1, wherein the determined measure data value for a node is determined from the measure data value for each metric record comprising a measure data value corresponding to that node's corresponding unique hierarchy ID.

3. The method of claim 1, wherein at least one hierarchy dimension comprises a plurality of hierarchy levels.

4. The method of claim 1, wherein the determined unique hierarchy IDs are sequentially ordered.

5. A system for optimizing performance of queries of a database by a computer, the system comprising:
   a computer memory storing, at least, the database for storing a plurality of metric records, each metric record comprising at least one measure data value and a plurality of hierarchy data values, wherein each hierarchy data value is in a hierarchy dimension, wherein each hierarchy dimension comprises at least one hierarchy level, said at least one hierarchy level including a lowest hierarchy level, wherein each hierarchy level comprises at least one distinct hierarchy member; and wherein each hierarchy data value matches a hierarchy member in the lowest level of the corresponding hierarchy dimension; and
   at least one processor configured to:
   a) determine the number of distinct members of the lowest hierarchy level of each hierarchy dimension and determine a unique hierarchy ID for such distinct member;
   b) determine the hierarchy dimension having the fewest number of distinct members in its lowest level;
   c) rank the hierarchy dimensions by number of distinct members in the respective lowest level;
   d) generate a first hypergraph tree for the hierarchy dimension having the fewest number of distinct members in its lowest level, wherein the first hypergraph tree comprises a tier for each hierarchy dimension; and
   e) generate one or more additional hypergraph trees, each additional hypergraph tree for a hierarchy dimension having more than the fewest number of distinct members in its lowest level, wherein each additional hypergraph tree comprises at least one tier for a hierarchy dimension and each additional hypergraph tree has fewer than the number of tiers in the first hypergraph tree;
   wherein each hypergraph tree comprises a plurality of nodes, and wherein each node corresponds to one of the unique hierarchy IDs, and wherein each node comprises at least one edge weighting comprising a determined measure data value,
   wherein all of the nodes in a tier correspond to the same hierarchy dimension, and
   wherein each generated hypergraph tree uniquely corresponds to a different hierarchy dimension;
   f) receive, via a dashboard interface displayed on a networked computing device, a query comprising one or more search parameters;
   g) identify a hierarchy dimension for each of the one or more search parameters;
   h) select, based on the one or more identified hierarchy dimensions, one of the first hypergraph tree and the one or more additional hypergraph trees;
   i) search the selected hypergraph tree to perform the query; and j) return a result of the query to the networked computing device for presentation in the dashboard interface.

6. The system of claim 5, wherein the determined measure data value for a node is determined from the measure data value for each metric record comprising a measure data value corresponding to that node's corresponding unique hierarchy ID.

7. The system of claim 5, wherein at least one hierarchy dimension comprises a plurality of hierarchy levels.

8. The system of claim 5, wherein the determined unique hierarchy IDs are sequentially ordered.

9. A method for optimizing performance of at least one query of a database by a computer, the computer having a processor and the processor being in electronic communication with a memory storing, at least, the database, the method comprising:

storing in the memory a set of hierarchy data tables generated based on a plurality of metric records stored in the database, each metric record including a set of data values and each data value being associated with a hierarchy dimension, each hierarchy data table being associated with a different hierarchy dimension and each hierarchy data table including a plurality of distinct data members, each distinct data member being assigned a unique hierarchy identifier;

operating the processor to assign each hierarchy dimension a dimension rank, wherein operating the processor to assign the dimension rank comprises:

for each hierarchy data table, determining a number of distinct data members in the respective hierarchy data table;

assigning each hierarchy dimension with the dimension rank sequentially according to the determined number of distinct data members for the set of hierarchy data tables, wherein the processor is configured to assign a first dimension rank to the hierarchy dimension associated with the hierarchy data table determined to have a fewest number of distinct data members and to assign a last dimension rank to the hierarchy dimension associated with the hierarchy data table determined to have a greatest number of distinct data members; and based on the plurality of metric records, generating at least one hypergraph tree for at least one hierarchy dimension according to the assigned dimension ranks; and in response to a query received via a dashboard interface of a networked computing device, operating the processor to: select one of the at least one hypergraph tree, search the selected hypergraph tree to perform the query, and return a result of the query to the networked computing device for presentation in the dashboard interface.

10. The method of claim 9, wherein generating the at least one hypergraph tree for the at least one hierarchy dimension according to the assigned dimension ranks comprises:

generating a first hypergraph tree based on one or more data values in the plurality of metric records associated with a first hierarchy dimension, the first hierarchy dimension being the hierarchy dimension assigned the first dimension rank, wherein generating the first hypergraph tree comprises generating an initial node for each distinct data value in the first hierarchy dimension in the plurality of metric records, a data value being a distinct data value when the data value is different from all other data values in the same hierarchy dimension; and generating a subsequent hypergraph tree based on one or more data values in the plurality of metric records associated with a subsequent hierarchy dimension of one or more subsequent hierarchy dimensions, the subsequent hierarchy dimension being different from the first hierarchy dimension and the subsequent hierarchy dimension corresponding to a dimension rank subsequent to the first dimension rank.

11. The method of claim 10, wherein generating the initial node for each distinct data value in the first hierarchy dimension in the plurality of metric records comprises, for each initial node:

identifying one or more metric records having a data value in the first hierarchy dimension corresponding to the distinct data value;

retrieving one or more measure data values corresponding to the identified one or more metric records;

determining a measure aggregation for the retrieved one or more measure data values; and associating the initial node with, at least, the distinct data value and the determined measure aggregation.

12. The method of claim 11, wherein the determined measure aggregation comprises one of: a sum; an average; a minimum; a maximum; and a distinct count.

13. The method of claim 12, wherein the distinct data value comprises a corresponding hierarchy identifier determined from the hierarchy data table associated with the first hierarchy dimension.

14. The method of claim 12 further comprises:

linking one or more subsequent nodes to the initial node according to the dimension ranks, each subsequent node corresponding to one of the one or more subsequent hierarchy dimensions.

15. The method of claim 14, wherein:

the one or more subsequent nodes comprises a first subsequent node corresponding to a second hierarchy dimension, the second hierarchy dimension being the hierarchy dimension assigned the second dimension rank; and linking the one or more subsequent nodes to the initial node comprises, for the first subsequent node:

identifying a subset of metric records from the identified one or more metric records, the subset of metric records having a common data value in the second hierarchy dimension;

retrieving one or more first subsequent measure data values corresponding to the identified subset of metric records;

determining a first subsequent measure aggregation for the retrieved one or more first subsequent measure data values; and associating the first subsequent node with the first subsequent measure aggregation.

16. The method of claim 9, wherein operating the processor to select one of the at least one hypergraph tree comprises identifying a hierarchy dimension for each of one or more search parameters included in the query, and selecting the hypergraph tree to be searched based on the one or more identified hierarchy dimensions.

17. A system for optimizing performance of at least one query of a database by a computer, the system comprises:

a memory storing, at least:

the database storing a plurality of metric records, each metric record including a set of data values and each data value being associated with a hierarchy dimension; and a set of hierarchy data tables generated based on the plurality of metric records, each hierarchy data table being associated with a different hierarchy dimension and each hierarchy data table including a plurality of distinct data members, each distinct data member being assigned a unique hierarchy identifier; and a processor in electronic communication with the memory, the processor being configured to:
assign each hierarchy dimension a dimension rank, wherein operating the processor to assign the dimension rank comprises:
for each hierarchy data table, determining a number of distinct data members in the respective hierarchy data table;
assigning each hierarchy dimension with the dimension rank sequentially according to the determined number of distinct data members for the set of hierarchy data tables, wherein the processor is configured to assign a first dimension rank to the hierarchy dimension associated with the hierarchy data table determined to have a fewest number of distinct data members and to assign a last dimension rank to the hierarchy dimension associated with the hierarchy data table determined to have a greatest number of distinct data members; and
based on the plurality of metric records, generate at least one hypergraph tree for at least one hierarchy dimension according to the assigned dimension ranks; and
receive a query via a dashboard interface of a networked computing device, select one of the at least one hypergraph tree, search the selected hypergraph tree to perform the query, and return a result of the query to the networked computing device for presentation in the dashboard interface.

18. The system of claim 17, wherein the processor is further configured to:
generate the at least one first hypergraph tree based on one or more data values in the plurality of metric records associated with a first hierarchy dimension, the first hierarchy dimension being the hierarchy dimension assigned the first dimension rank, wherein the processor is further configured to generate an initial node for each distinct data value in the first hierarchy dimension in the plurality of metric records, a data value being a distinct data value when the data value is different from all other data values in the same hierarchy dimension; and
generate a subsequent hypergraph tree based on one or more data values in the plurality of metric records associated with a subsequent hierarchy dimension of one or more subsequent hierarchy dimensions, the subsequent hierarchy dimension being different from the first hierarchy dimension and the subsequent hierarchy dimension corresponding to a dimension rank subsequent to the first dimension rank.

19. The system of claim 18, wherein, for each initial node, the processor is configured to:
identify one or more metric records having a data value in the first hierarchy dimension corresponding to the distinct data value;
retrieve one or more measure data values corresponding to the identified one or more metric records;
determine a measure aggregation for the retrieved one or more measure data values; and
associate the initial node with, at least, the distinct data value and the determined measure aggregation.

20. The system of claim 19, wherein the measure aggregation comprises one of: a sum; an average; a minimum; a maximum; and a distinct count.

21. The system of claim 19, wherein the distinct data value comprises a corresponding hierarchy identifier determined from the hierarchy data table associated with the first hierarchy dimension.

22. The system of claim 19, wherein the processor is configured to:
link one or more subsequent nodes to the initial node according to the dimension ranks, each subsequent node corresponding to one of the one or more subsequent hierarchy dimensions.

23. The system of claim 22, wherein:
the one or more subsequent nodes comprises a first subsequent node corresponding to a second hierarchy dimension, the second hierarchy dimension being the hierarchy dimension assigned the second dimension rank; and
for the first subsequent node, the processor is configured to:
identify a subset of metric records from the identified one or more metric records, the subset of metric records having a common data value in the second hierarchy dimension;
retrieve one or more first subsequent measure data values corresponding to the identified subset of metric records;
determine a first subsequent measure aggregation for the retrieved one or more first subsequent measure data values; and
associate the first subsequent node with the first subsequent measure aggregation.

24. The system of claim 17, wherein the processor is configured to select one of the at least one hypergraph tree by identifying a hierarchy dimension for each of one or more search parameters included in the query, and to select the hypergraph tree to be searched based on the one or more identified hierarchy dimensions.

* * * * *